(12) United States Patent
Brogan et al.

(10) Patent No.: US 11,751,299 B2
(45) Date of Patent: *Sep. 5, 2023

(54) MULTI-LOCATION LOAD CONTROL SYSTEM

(71) Applicant: Lutron Technology Company LLC, Coopersburg, PA (US)

(72) Inventors: Quinn Brogan, Hellertown, PA (US); Donald F. Hausman, Jr., New Tripoli, PA (US); Bauyrzhan Krykpayev, Mountain View, CA (US); Robert C. Newman, Jr., Emmaus, PA (US)

(73) Assignee: Lutron Technology Company LLC, Coopersburg, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/556,491

(22) Filed: Dec. 20, 2021

(65) Prior Publication Data

US 2022/0117051 A1 Apr. 14, 2022

Related U.S. Application Data

(63) Continuation of application No. 17/082,466, filed on Oct. 28, 2020, now Pat. No. 11,206,716, which is a
(Continued)

(51) Int. Cl.
*H05B 39/08* (2006.01)
*H05B 39/06* (2006.01)
(Continued)

(52) U.S. Cl.
CPC ........... *H05B 39/083* (2013.01); *H05B 39/06* (2013.01)

(58) Field of Classification Search
CPC ...... H05B 47/19; H05B 39/048; H05B 39/08; H05B 47/175; H05B 45/20; H05B 47/10; H05B 47/105; H05B 45/10; H05B 45/31
See application file for complete search history.

(56) References Cited

U.S. PATENT DOCUMENTS 5,248,919 A 9/1993 Hanna et al.
5,798,581 A 8/1998 Keagy et al.
(Continued)

FOREIGN PATENT DOCUMENTS

EP 2775802 A1 9/2014

*Primary Examiner* — Wei (Victor) Y Chan
(74) *Attorney, Agent, or Firm* — Michael Czarnecki; Glen Farbanish; Philip Smith

(57) ABSTRACT

A multiple location load control system may comprise a main load control device and an accessory load control device. The main load control device may control an amount of power delivered to an electrical load from an AC power source using a control circuit and a controllably conductive device. The accessory load control device may be coupled to the main load control device via an accessory terminal. The accessory load control device may detect a user input for changing a characteristic of the electrical load and may send a signal to the main load control device indicating the user input. The main load control device may detect a pattern of the signal based on a threshold and further determine the user input in response to the detected pattern. The main load control device may adjust the threshold based on line/load conditions of the multiple location load control system.

12 Claims, 9 Drawing Sheets

Related U.S. Application Data continuation of application No. 16/696,654, filed on Nov. 26, 2019, now Pat. No. 10,827,572.

(60) Provisional application No. 62/806,339, filed on Feb. 15, 2019, provisional application No. 62/773,786, filed on Nov. 30, 2018.

(51) Int. Cl.
  *H05B 47/19* (2020.01)
  *H05B 47/175* (2020.01)
  *H05B 45/20* (2020.01)

(56) References Cited

U.S. PATENT DOCUMENTS

| | | |
|---|---|---|
| 7,242,150 B2 | 7/2007 | DeJonge et al. |
| 7,247,999 B2 | 7/2007 | Kumar |
| 7,546,473 B2 | 6/2009 | Newman et al. |
| 7,872,429 B2 | 1/2011 | Steiner et al. |
| 8,664,881 B2 | 3/2014 | Salvestrini et al. |
| 9,681,513 B2 | 6/2017 | Dadshnialehi et al. |
| 9,699,863 B2 | 7/2017 | Weightman et al. |
| 2006/0250093 A1 | 11/2006 | Kumar |
| 2014/0177469 A1* | 6/2014 | Neyhart ................ G05B 15/02 370/254 |

* cited by examiner

MULTI-LOCATION LOAD CONTROL SYSTEM

CROSS-REFERENCE TO RELATED APPLICATIONS

This application is a continuation of U.S. patent application Ser. No. 17/082,466 filed Oct. 28, 2020; which is a continuation of U.S. patent application Ser. No. 16/696,654, filed Nov. 26, 2019 (now U.S. Pat. No. 10,827,572), which claims the benefit of U.S. Provisional Patent Application No. 62/806,339, filed Feb. 15, 2019, and U.S. Provisional Patent Application No. 62/773,786, filed Nov. 30, 2018, the disclosures of which are incorporated herein by reference in their entireties.

BACKGROUND

Three-way and four-way switch systems may be used for controlling electrical loads, such as lighting loads. Typically, the switches are coupled together in series electrical connection between an alternating-current (AC) power source and the lighting load. The switches are subjected to an AC source voltage and carry full load current between the AC power source and the lighting load, as opposed to low-voltage switch systems that operate at low voltage and low current, and communicate digital commands (usually low-voltage logic levels) to a remote controller that controls the level of AC power delivered to the load in response to the commands. Thus, as used herein, the terms "three-way switch", "three-way system", "four-way switch", and "four-way system" mean such switches and systems that are subjected to the AC source voltage and carry the full load current.

A three-way switch derives its name from the fact that it has three terminals and is more commonly known as a single-pole double-throw (SPDT) switch, but will be referred to herein as a "three-way switch". Note that in some countries a three-way switch as described above is known as a "two-way switch". A four-way switch is a double-pole double-throw (DPDT) switch that is wired internally for polarity-reversal applications. A four-way switch is commonly called an intermediate switch, but will be referred to herein as a "four-way switch". In a typical, prior art three-way switch system, two three-way switches control a single lighting load, and each switch is fully operable to independently control the load, irrespective of the status of the other switch. In such a three-way switch system, one three-way switch must be wired at the AC power source side of the system (sometimes called "line side"), and the other three-way switch must be wired at the lighting load side (sometimes called "load side") of the system.

Three-way dimmer switches that replace three-way switches are known in the art. The three-way dimmer switch may include a dimming circuit (e.g., a phase-control dimming circuit) and a three-way switch. The dimmer circuit may regulate the amount of energy supplied to a lighting load by conducting for some portion of each half cycle of the AC source voltage, and not conducting for the remainder of the half cycle. Because the dimming circuit is in series with the lighting load, the longer the dimming circuit conducts, the more energy will be delivered to the lighting load. Where the lighting load is a lamp, the more energy that is delivered to the lighting load, the greater the light intensity level of the lamp. In a typical dimming operation, a user may adjust a control to set the light intensity level of the lamp to a desired light intensity level. The portion of each half cycle for which the dimming circuit conducts is based on the selected light intensity level. The user is able to dim and toggle the lighting load from the three-way dimmer switch and is only able to toggle the lighting load from the three-way switch. Two three-way dimmer switches cannot control a common lighting load since two dimming circuits cannot be wired in series.

Multiple location dimming systems employing a smart dimmer and one or more specially-designed remote (or "accessory") dimmers have been developed. A smart dimmer may be one that includes a dimming circuit and a microcontroller or other processing means for providing an advanced set of control features and feedback options to the end user. For example, the advanced features of a smart dimmer may include a protected or locked lighting preset, fading, and double-tap to full intensity. The microcontroller controls the operation of a semiconductor switch of the dimming circuit to thus control the intensity of the lighting load. To power the microcontroller, the smart dimmer may include one or more power supplies, which draw a small amount of current through the lighting load when the semiconductor switch is non-conductive each half cycle. The power supply typically uses this small amount of current to charge a storage capacitor and develop a direct-current (DC) voltage to power the microcontroller.

An accessory dimmer may not include a dimming circuit, but may be used to adjust the intensity level of the lighting load from multiple locations by sending signals to a smart dimmer indicating a user input received (e.g., actuation of an actuator) on the accessory dimmer. The signal is usually sent through an accessory-dimmer line connecting the accessory dimmer and the smart dimmer. In response to such signals, the smart dimmer can exercise control over the lighting load using one or more advanced features of the smart dimmer. The accessory dimming may not include a microcontroller or other processing means for providing an advanced set of control features and feedback options to the end user. An example of a multiple location lighting control system, including a wall-mountable smart dimmer switch and wall-mountable remote switches for wiring at all locations of a multiple location dimming system, is disclosed in commonly assigned U.S. Pat. No. 5,248,919, issued on Sep. 28, 1993, entitled LIGHTING CONTROL DEVICE, which is herein incorporated by reference in its entirety.

The multiple location lighting control system described above may suffer from one or more drawbacks. For example, the signal generated by the accessory dimmer indicating a user input may be subject to the impact of line and/or load conditions (e.g., long run of wires, capacitive holdup, etc.) of the multiple location lighting control system. Such line and/or load conditions may cause the smart dimmer to miss or misinterpret the signals sent by the accessory dimmer, and thereby fail to control the lighting load according to the user input received at the accessory dimmer.

SUMMARY

Described herein is a multi-location load control system comprising a load control device (e.g., a main load control device) and at least one accessory control device. The load control device may be configured to control an amount of power delivered to an electrical load from an AC power source. The load control device may comprise a first main terminal, a second main terminal, and an accessory terminal. The load control device may conduct a load current from the AC power source to the electrical load via the first and second main terminals. The load control device may be coupled to the accessory control device and receive an input signal from the accessory control device indicating an actuation state of the accessory control device. Such actuation state may correspond to, for example, toggling the electrical load on and off, raising the amount of power delivered to the electrical load, or lowering the amount of power delivered to the electrical load.

The load control device may further comprise a multi-location circuit configured to sense the input signal and generate a multi-location signal in response to the input signal. A control circuit of the load control device may control the amount of power delivered to the electrical load based on the multi-location signal. More specifically, the control circuit may sample (e.g., via an analog-to-digital converter (ADC)) the multi-location signal and determine a pattern of the multi-location signal over one or more half cycles of an AC mains line voltage generated by the AC power source. The control circuit may determine the pattern based on a high threshold and a low threshold, and may dynamically adjust the high threshold based on an indication of a voltage across the main load control device. In addition, the load control device may include additional circuitry configured to further discharge voltages developed in the multi-location system under long wire run and/or other abnormal load conditions. The control circuit may determine the actuation state of the accessory control device in response to the detected pattern and may generate a control signal to control the amount of power delivered to an electrical load in accordance with the actuation state of the accessory control device.

DETAILED DESCRIPTION

Figure 1:
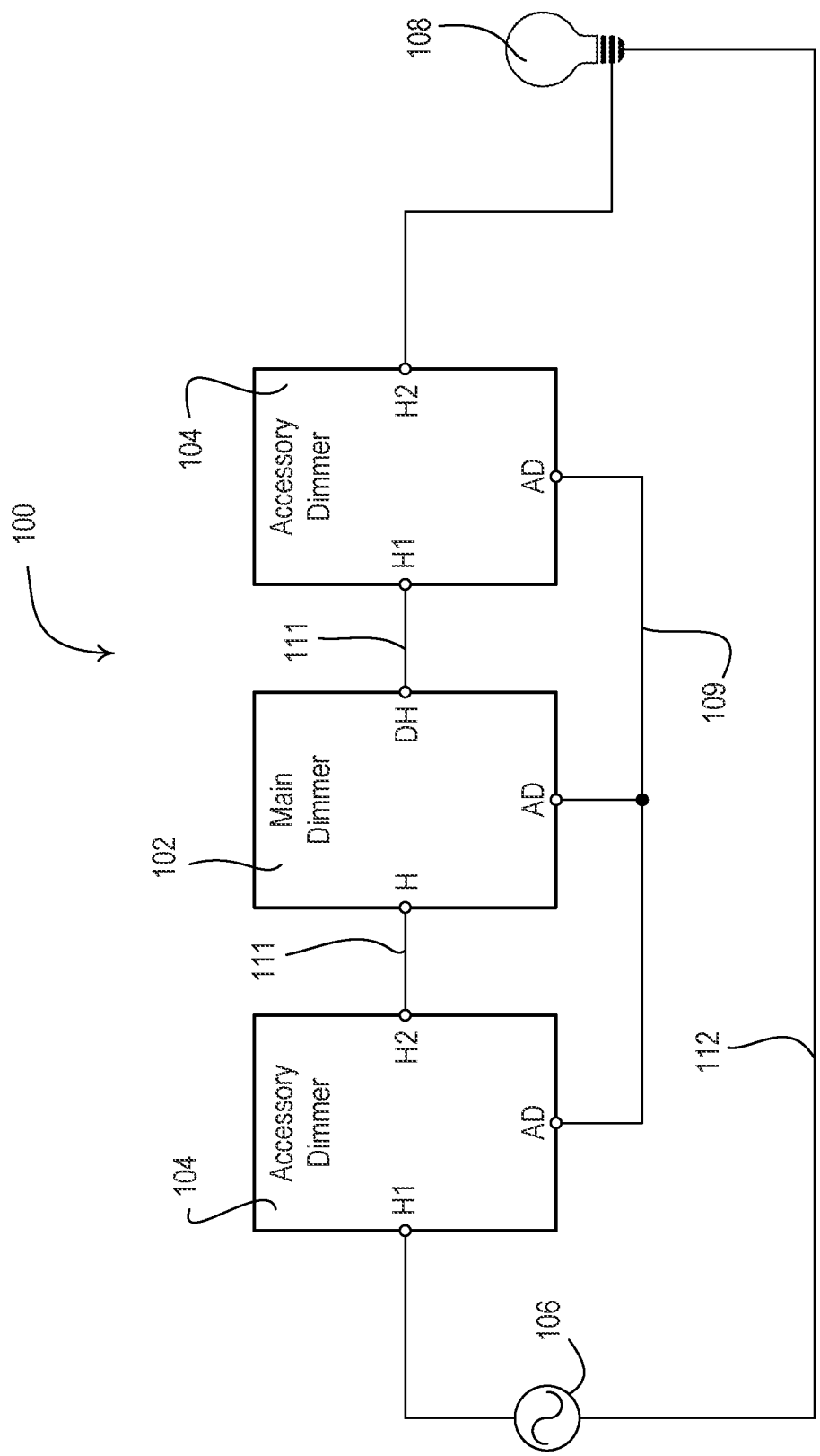
FIG. 1 is a block diagram of an example of a multiple-location load control system, e.g., a multiple location dimming system.

FIG. 1 is a block diagram of an example of a multiple-location load control system 100, e.g., a multiple location dimming system. The multiple-location load control system 100 may comprise a main load control device, e.g., a main dimmer 102, and one or more remote load control devices, e.g., two accessory dimmers 104. The main dimmer 102 and accessory dimmers 104 may be coupled in series electrical connection between an alternating-current (AC) power source 106 and a lighting load 108, for example, via a traveler wiring 111. The traveler wiring 111 may couple the AC power source 106 to the lighting load 108 via the main dimmer 102 and one or more accessory dimmers 104, for example, to provide power to the lighting load 108. Neutral wiring 112 may couple the lighting load 108 back to the AC power source 106, for example, to provide a return path for any remaining power provided by the AC power source 106 and not dissipated by the lighting load 108. The accessory dimmers 104 may be wired to the line side of the load control system 100 (e.g., to the left of the main dimmer 102 as shown in FIG. 1 and/or at the AC power source side of the system) or the load side of the load control system 100 (e.g., to the right of the main dimmer 102 as shown in FIG. 1 and/or at the lighting load side of the system). Further, the load control system 100 may include any number of (e.g., more or less than two) accessory dimmers 104.

The main dimmer 102 may comprise a first main terminal and a second main terminal. For example, the main dimmer 102 may comprise a hot terminal H (e.g., a line-side terminal) adapted to be coupled to the line side of the load control system 100 and a dimmed-hot terminal DH (e.g., a load-side terminal) adapted to be coupled to the load side of the load control system 100. The main dimmer 102 may comprise a load control circuit coupled between the hot and dimmed-hot terminals for controlling the amount of power delivered to the lighting load 108 (e.g., the main dimmer may be configured to conduct a load current from the AC power source to the electrical load via the hot and dimmed-hot terminals). The main dimmer 202 may comprise a user interface (not shown) that include, for example, one or more actuators (e.g., buttons), such as a toggle actuator for turning the lighting load 108 on and off, an intensity adjustment actuator (e.g., a slider control or a pair of raise and lower buttons) for adjusting the intensity of the lighting load 108, and/or a color adjustment actuator (e.g., a slider control or a pair of raise and lower buttons) for adjusting the color of light emitted by the lighting load 108. The user interface may also comprise one or more visual indicators configured to be illuminated to provide, for example, a visual representation of the status and/or intensity of the lighting load 108.

The accessory dimmers 104 may comprise a first main terminal and a second main terminal. For example, the accessory dimmers 104 may comprise two hot terminals H1, H2, which may conduct the load current from the AC power source 106 to the lighting load 108. The main dimmer 102 and the accessory dimmers 104 may each comprise an accessory dimmer terminal AD (e.g., accessory terminal) coupled together via an accessory-dimmer line 109 (e.g., a single accessory wiring). The accessory dimmers 104 may each include a user interface (not shown) that includes, for example, one or more actuators for controlling various operational characteristics (e.g., on/off, intensity, and/or color) of the lighting load 108. For example, The accessory dimmers 104 may include a toggle actuator for turning the lighting load 108 on and off, an intensity adjustment actuator (e.g., a slider control or a pair of raise and lower buttons) for adjusting the intensity of the lighting load 108, and/or a color adjustment actuator (e.g., a slider control or a pair of raise and lower buttons) for adjusting the color of light emitted by the lighting load 108. The accessory dimmers 104 may each be configured to send signals indicating actuation of one or more of the actuators of the user interface to the main dimmer 102 via the accessory-dimmer line 109. Such signals or indications may cause the main dimmer 102 to control the lighting load 108 in accordance with the actuation state of the accessory dimmers 104.

Figure 2:
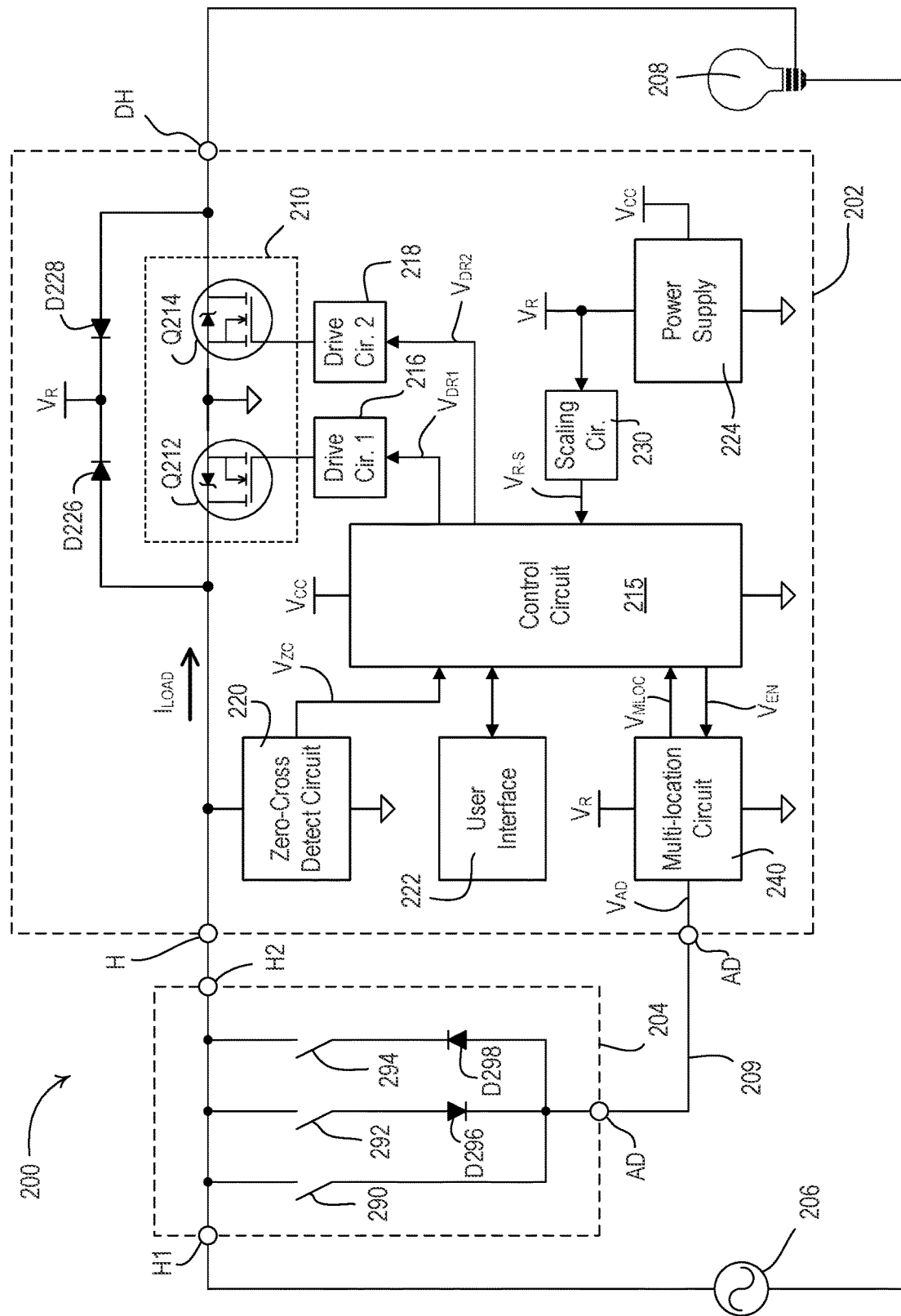
FIG. 2 is a simplified block diagram of an example load control system including a main dimmer and an accessory dimmer.

FIG. 2 is a simplified block diagram of an example load control system 200 (e.g., a multi-location load control system) for controlling the amount of power delivered to an electrical load, such as, a lighting load 208. The load control system 200 may comprise a main dimmer 202 (e.g., which may be similar to the main dimmer 102 shown in FIG. 1) and an accessory dimmer 204 (e.g., which may be similar to both of the accessory dimmers 104 shown in FIG. 1). The main dimmer 200 may include a hot terminal H 290 (e.g., a line-side terminal) adapted to be coupled to the line side of the load control system 200 for receiving an AC mains line voltage $V_{AC}$, and a dimmed-hot terminal DH (e.g., a load-side terminal) adapted to be coupled to the load side of the system 200. The main dimmer 202 may conduct a load current $I_{LOAD}$ from the AC power source 206 through the lighting load 208 and generate a phase-control voltage $V_{PC}$ (e.g., a dimmed-hot voltage) at the dimmed-hot terminal DH. The main dimmer 202 may also include a neutral terminal (not shown) that may be adapted to be coupled (e.g., optionally coupled) to a neutral side of the AC power source 206. For example, the main dimmer 202 may be configured to operate in a two-wire mode when the neutral terminal is not connected to the neutral side of the AC power source 206 and in a three-wire mode when the neutral terminal is connected to the neutral side of the AC power source.

The accessory dimmer 204 may comprise two hot terminals H1, H2, which may be coupled in series between the AC power source 206 and the lighting load 208. The hot terminals H1, H2 may operate to conduct the load current $I_{LOAD}$ from the AC power source 206 to the lighting load 208. The accessory dimmer 204 may also comprise an accessory-dimmer terminal AD coupled to an accessory-dimmer terminal AD of the main dimmer 202 via an accessory-dimmer line 209. As shown in FIG. 2, the accessory dimmer 204 may be located on the line side (e.g., between the AC power source 206 and the main dimmer 202) of the load control system 200 (e.g., as shown in FIG. 2). The accessory dimmer 204 may also be located on the load side (e.g., between the main dimmer 202 and the lighting load 208) of the load control system 200 (e.g., as shown in FIG. 1), such that the hot terminals H1, H2 are coupled between the dimmed-hot terminal DH of the main dimmer 202 and the lighting load 208.

The accessory dimmer 204 may comprise a single hot terminal (e.g., rather than the two hot terminals H1, H2) coupled to the hot side of the AC power source 206 and the hot terminal H of the main dimmer 202 (e.g., the hot side of the AC power source 206 may be directly connected to the hot terminal of the main dimmer 202), such that the accessory dimmer 204 does not conduct the load current $I_{LOAD}$. Similarly, if the accessory dimmer 204 is connected to the load side of the load control system, the single hot terminal of the accessory dimmer may be connected to the dimmed hot terminal DH and a dimmed-hot side of the lighting load 208, such that the accessory dimmer does not conduct the load current $I_{LOAD}$.

The main dimmer 202 may comprise a controllably conductive device 210 electrically coupled between the hot terminal H and the dimmed-hot terminal DH. As shown in FIG. 2, the controllably conductive 210 may comprise multiple (e.g., two) field-effect transistors (FETs) such as FETs Q212, Q214 coupled in anti-series connection. The junction of the FETs Q212, Q214 may be coupled to circuit common. The controllably conductive device 210 may also comprise, for example, a thyristor (e.g., a triac), a FET in a full-wave rectifier bridge, one or more insulated-gate bipolar junction transistors (IGBTs), or any suitable bidirectional semiconductor switch. The main dimmer 202 may comprise a control circuit 215, e.g., a digital control circuit, for controlling the FETs Q212, Q214 to conduct the load current $I_{LOAD}$ through the lighting load 208. The control circuit 215 may include one or more of a processor (e.g., a microprocessor), a microcontroller, a programmable logic device (PLD), a field programmable gate array (FPGA), an application specific integrated circuit (ASIC), or any suitable controller or processing device. The main dimmer 202 may comprise a memory (not shown) configured to store operational characteristics of the main dimmer. The memory may be implemented as an external integrated circuit (IC) or as an internal circuit of the control circuit 215.

The control circuit 215 may be configured to control the controllably conductive device 210 using a phase-control dimming technique (e.g., a forward phase-control dimming technique or a reverse phase-control diming technique). The control circuit 215 may generate first and second drive signals $V_{DR1}$, $V_{DR2}$ that may be coupled to the gates of the respective FETs Q212, Q214 via first and second gate drive circuits 216, 218, respectively, for rendering the FETs conductive and non-conductive. When the controllably conductive device 210 is rendered conductive during the positive half cycles of the AC power source 206, the load current $I_{LOAD}$ may be conducted through the drain-source channel of the first FET Q212 and the body diode of the second FET Q214. When the controllably conductive device 210 is rendered conductive during the negative half cycles of the AC power source 206, the load current $I_{LOAD}$ may be conducted through the drain-source channel of the second FET Q214 and the body diode of the first FET Q212.

The control circuit 215 may be configured to render the controllably conductive device conductive (or non-conductive) at a firing angle (e.g., a firing time) each half cycle of the AC power source 206 to adjust the amount of power delivered to and thus the intensity of the lighting load 208. The control circuit 215 may be configured to adjust the intensity of the lighting load 208 towards a target intensity $L_{TRGT}$ that may range between a high-end intensity $L_{HE}$ (e.g., 100%) and a low-end intensity $L_{LE}$ (e.g., 0.1-5%). The control circuit 215 may be configured to control the main dimmer 200 into an electronic off state in which the controllably conductive device 210 is rendered non-conductive to turn off the lighting load 208, and the control circuit 215 remains powered (e.g., the AC mains line voltage $V_{AC}$ is developed across the main dimmer 200).

The main dimmer 202 may comprise a zero-crossing detect circuit 220 configured to generate a zero-cross detect signal $V_{ZC}$ that indicates the zero-crossing points of the AC mains line voltage $V_{AC}$ of the AC power source 206. The zero-cross detect circuit 200 may be coupled between the hot terminal H and circuit common. The control circuit 215 may configured to receive the zero-cross detect signal $V_{ZC}$ and determine times of the zero-crossing points of the AC mains line voltage $V_{AC}$ from the zero-cross detect signal $V_{ZC}$. The control circuit 215 may then render the FETs Q212, Q214 conductive and/or non-conductive at predetermined times (e.g., at a firing time or firing angle) relative to the zero-crossing points of the AC mains line voltage $V_{AC}$ to generate a phase-control voltage $V_{PC}$ using the phase-control dimming technique. Examples of dimmers that use phase-control dimming techniques are described in greater detail in commonly-assigned U.S. Pat. No. 7,242,150, issued Jul. 10, 2007, entitled DIMMER HAVING A POWER SUPPLY MONITORING CIRCUIT; U.S. Pat. No. 7,546,473, issued Jun. 9, 2009, entitled DIMMER HAVING A MICROPROCESSOR-CONTROLLED POWER SUPPLY; and U.S. Pat. No. 8,664,881, issued Mar. 4, 2014, entitled TWO-WIRE DIMMER SWITCH FOR LOW-POWER LOADS, the entire disclosures of which are incorporated by reference herein.

The main dimmer 202 may comprise a user interface 222 that includes, for example, one or more actuators (e.g., buttons) for receiving user inputs and/or one or more visual indicators for providing user feedback. For example, the user interface 214 may comprise a toggle actuator and an intensity adjustment actuator, such as a slider control or a pair of raise and lower buttons. The control circuit 215 may be configured to control the controllably conductive device 210 to turn on and off in response to actuations of the toggle actuator of the user interface 222. The control circuit 215 may be configured to adjust the intensity of the lighting load 208 in response to actuations of the intensity adjustment actuator of the user interface 222. The control circuit 215 may be configured to illuminate the visual indicators of the user interface 222 to provide, for example, a visual representation of the status and/or intensity of the lighting load 208.

The main dimmer 202 may comprise a rectifier circuit (e.g., a full-wave rectifier bridge) including diodes D226, D228, and body diodes of the FETs Q212, Q214 for generating a rectified voltage $V_R$. The diode D226 may be coupled between the hot terminal H and the rectified voltage $V_R$, and the diode D228 may be coupled between the dimmed-hot terminal DH and the rectified voltage $V_R$, such that rectifier bridge may be characterized by AC terminals coupled across the controllably conductive device 210. The main dimmer 202 may include a power supply 224 that may be configured to receive the rectified voltage $V_R$ and generate a direct-current (DC) supply voltage $V_{CC}$ for powering the control circuit 215 and the other low-voltage circuitry of the main dimmer (e.g., the power supply 224 may be coupled across DC terminals of the rectifier bridge). The power supply 224 may be configured to conduct a charging current through the dimmed-hot terminal DH and lighting load 208. In addition, if the dimmer switch 202 comprises a neutral terminal connected to the neutral side of the AC power source 206, the main dimmer 202 may comprise a third diode (not shown) coupled between the neutral terminal and the rectified voltage $V_R$, and the power supply 224 may be configured to conduct the charging current through the neutral terminal.

The control circuit 215 may be configured to monitor the magnitude of the rectified voltage $V_R$. The main dimmer 202 may comprise a scaling circuit 230 configured to receive the rectified voltage $V_R$ and generate a scaled rectified voltage $V_{R-S}$. For example, the scaling circuit 230 may comprise a resistive divider circuit. The main dimmer 202 may comprise an analog-to-digital converter (ADC) (e.g., as part of the control circuit 215) configured to sample the scaled rectified voltage $V_{R-S}$ to allow the control circuit to determine a magnitude (e.g., a peak magnitude) of the rectified voltage $V_R$. The control circuit 215 may be configured to detect an overvoltage condition of the voltage generated across the controllably conductive device 210 (e.g., across one or both of the FETs Q212, Q214) in response to the magnitude of the rectified voltage $V_R$.

The main dimmer 202 may comprise a multi-location circuit 240 coupled to the accessory-dimmer terminal AD for receiving an accessory-dimmer voltage $V_{AD}$. The multi-location circuit 240 may be configured to generate a multi-location signal $V_{MLOC}$ in response to the accessory-dimmer voltage $V_{AD}$. For example, the multi-location signal $V_{MLOC}$ may be a scaled version of the accessory-dimmer voltage $V_{AD}$. The analog-to-digital converter of the control circuit 215 may be configured to receive the multi-location signal $V_{MLOC}$. The control circuit 215 may be configured to sample the multi-location signal $V_{MLOC}$ to determine a magnitude of the multi-location signal $V_{MLOC}$ and/or the magnitude of the accessory-dimmer voltage $V_{AD}$. In addition, the control circuit 215 may generate an enable control signal $V_{EN}$ for disabling the multi-location circuit 240 (e.g., not generating the multi-location signal $V_{MLOC}$) when the control circuit 215 is not sampling the multi-location signal $V_{MLOC}$ (e.g., to save power).

The accessory dimmer 204 may comprise one or more switches 290, 292, 294 (e.g., momentary mechanical tactile switches) configured to control various operational characteristics (e.g., on/off, intensity, and/or color) of the lighting load 208. For example, the first switch 290 may be actuated by a toggle button, the second switch 292 may be actuated by a raise button, and the third switch 294 may be actuated by a lower button. The first switch 290 may be coupled in series between the first and second hot terminals H1, H2 and the accessory-dimmer terminal AD of the accessory dimmer 204, such that the first switch 290 is able to conduct current in both the positive and negative half cycles of the AC mains line voltage $V_{AC}$ when the switch 290 is closed. The second switch 292 may be coupled in series with a first diode 296 between the first and second hot terminals H1, H2 and the accessory-dimmer terminal AD of the accessory dimmer 204. The second diode 296 may be coupled such that the second switch 292 is able to conduct current during the positive half cycles of the AC mains line voltage $V_{AC}$ (e.g., and not during the negative half cycles) when the second switch 292 is closed. The third switch 294 may be coupled in series with a second diode 298 between the first and second hot terminals H1, H2 and the accessory-dimmer terminal AD of the accessory dimmer 204. The second diode 298 may be coupled such that the third switch 294 is able to conduct current during the negative half cycles of the AC mains line voltage $V_{AC}$ (e.g., and not during the positive half cycles) when the third switch 294 is closed. The accessory dimmer 204 may be configured to generate an input signal on accessory-dimmer line 209 when one or more of the switches 290, 292, 294 are being actuated.

The multi-location circuit 240 may generate the multi-location signal $V_{MLOC}$ in response to the input signal generated by the accessory dimmer 204. The control circuit 215 may be configured to detect patterns in the multi-location signal $V_{MLOC}$ during the positive and negative half cycles (e.g., during a portion of each positive or negative half cycle) of the AC mains line voltage $V_{AC}$ to determine which of the switches 290, 292, 294 may presently be closed (e.g., which of the toggle button, raise button, and lower button of the accessory dimmer 204 is presently being actuated). For example, when the first switch 290 is closed (e.g., momentarily closed in response to a momentary actuation of the toggle button), the multi-location signal $V_{MLOC}$ may be in a high state (e.g., the magnitude of the multi-location signal $V_{MLOC}$ may be above a certain first threshold) in the positive half cycles and in a low state (e.g., the magnitude of the multi-location signal $V_{MLOC}$ may be below a certain second threshold) in the negative half cycles. When the second switch 292 is closed (e.g., momentarily closed in response to a momentary actuation of the raise button), the multi-location signal $V_{MLOC}$ may be in the high state in the positive half cycles (e.g., since the first diode D296 is positively biased) and an idle state (e.g., the magnitude of the multi-location signal $V_{MLOC}$ may be between the first and second thresholds) in the negative half cycles (e.g., since the first diode D296 is negatively biased and current is not able to flow through the second switch 292). When the third switch 294 is closed (e.g., momentarily closed in response to a momentary actuation of the lower button), the multi-location signal $V_{MLOC}$ may be in the idle state in the positive half cycles (e.g., since the second diode D298 is negatively biased) and the low state in the negative half cycles (e.g., since the second diode D296 is positively biased).

The control circuit 215 may be configured to detect the state of the multi-location signal $V_{MLOC}$ during one or more half cycles of the AC mains line voltage $V_{AC}$ (e.g., during each half cycle of the AC mains line voltage $V_{AC}$) and determine which of the switches 290, 292, 294 may be presently closed in response to detecting a pattern of states in the positive and negative half cycles (e.g., in a portion of each positive or negative half cycle). For example, the control circuit 215 may be configured to detect that the toggle button is presently being actuated in response to detecting that the multi-location signal $V_{MLOC}$ is in the high state in the positive half cycles and the low state in the negative half cycles. The control circuit 215 may be configured to detect that the raise button is presently being actuated in response to detecting that the multi-location signal $V_{MLOC}$ is in the high state in the positive half cycles and the idle state in the negative half cycles. The control circuit 215 may be configured to detect that the lower button is presently being actuated in response to detecting that the multi-location signal $V_{MLOC}$ is in the idle state in the positive half cycles and the low state in the negative half cycles.

If the accessory dimmer 204 is located on the load side of the load control system 200, the control circuit 215 may be configured to detect different patterns (e.g., compared to when the accessory dimmer 204 is located on the line side of the load control system 200) in the multi-location signal $V_{MLOC}$ during the positive and negative half cycles (e.g., during respective portions of the positive and negative half cycles). The control circuit 215 may be configured to determine which of the toggle button, raise button, and lower button of the accessory dimmer 204 is presently being actuated in response to detecting the patterns. For example, when the accessory dimmer 204 is located on the load side and the first switch 290 is closed, the multi-location signal $V_{MLOC}$ may be in the low state in the positive half cycles and in the high state in the negative half cycles. When the accessory dimmer 204 is located on the load side and the second switch 292 is closed, the multi-location signal $V_{MLOC}$ may be in the idle state in the positive half cycles (e.g., since the first diode D296 is negatively biased) and the high state in the negative half cycles (e.g., since the first diode D296 is positively biased). When the accessory dimmer 204 is located on the load side and the third switch 294 is closed, the multi-location signal $V_{MLOC}$ may be in the low state in the positive half cycles (e.g., since the second diode D298 is positively biased) and the idle state in the negative half cycles (e.g., since the second diode D296 is negatively biased). The control circuit 215 may be configured to detect that the toggle button is presently being actuated in response to detecting that the multi-location signal $V_{MLOC}$ is in the low states in the positive half cycles and the high states in the negative half cycles, to detect that the raise button is presently being actuated in response to detecting that the multi-location signal $V_{MLOC}$ is in the idle states in the positive half cycles and the high states in the negative half cycles, and to detect that the lower button is presently being actuated in response to detecting that the multi-location signal $V_{MLOC}$ is in the low states in the positive half cycles and the idle states in the negative half cycles.

The control circuit 215 may be configured to sample (e.g., using the ADC of the control circuit) the multi-location signal $V_{MLOC}$ and compare the magnitude of the multi-location signal $V_{MLOC}$ to high and/or low thresholds $TH_{HI}$, $TH_{LO}$ to determine the present state of the multi-location signal $V_{MLOC}$ (e.g., the high, idle, or low state). For example, if the magnitude of the multi-location signal $V_{MLOC}$ is greater than the high threshold $TH_{HI}$, the control circuit 215 may determine that the multi-location signal $V_{MLOC}$ is in the high state. If the magnitude of the multi-location signal $V_{MLOC}$ is less than the low threshold $TH_{LO}$, the control circuit 215 may determine that the multi-location signal $V_{MLOC}$ is in the low state. If the magnitude of the multi-location signal $V_{MLOC}$ is between the high threshold $TH_{HI}$ and the low threshold $TH_{LO}$, the control circuit 215 may determine that the multi-location signal $V_{MLOC}$ is in the idle state.

The magnitude of the accessory-dimmer voltage $V_{AD}$ and thus the magnitude of the multi-location signal $V_{MLOC}$ may be dependent upon the magnitude of the AC mains line voltage $V_{AC}$ and/or the magnitude of the phase-control voltage $V_{PC}$. The lighting load 208, the electrical wiring (e.g., length and/or capacitance of the wiring between the accessory dimmer 204 and the main dimmer 202), and/or other conditions in the load control system 200 may cause abnormal adjustments and/or shifts in the magnitude of the accessory-dimmer voltage $V_{AD}$ (e.g., due to capacitance of the lighting load and/or electrical wiring), which may cause the magnitude of the multi-location signal $V_{MLOC}$ to cross the high or low thresholds $TH_{HI}$, $TH_{LO}$ at times that do not indicate changes of the states of the multi-location signal $V_{MLOC}$. The time at which the multi-location signal $V_{MLOC}$ is sampled (e.g., the location of a multi-location signal sampling window $T_{MLOC}$ within a half cycle) may also affect the accuracy of the measurements of the multi-location signal $V_{MLOC}$. For example, when the firing time is near the high-end or low-end, the magnitude of the rectified voltage $V_R$ may be low, and measurements of the multi-location signal $V_{MLOC}$ taken at these times may not be accurate. The control circuit 215 may be configured to adjust (e.g., dynamically adjust) the high threshold $TH_{HI}$ and/or the low threshold $TH_{LO}$ to detect the states of the multi-location signal $V_{MLOC}$ (e.g., independent of the magnitude of the AC mains load voltage $V_{AC}$, the magnitude of the phase-control voltage $V_{PC}$, and/or the timing of the multi-location signal sampling window $T_{MLOC}$). The control circuit 215 may be configured to measure the magnitude of the rectified voltage $V_R$ (e.g., which may indicate the magnitude of the voltage across the main dimmer 202) and adjust the high threshold $TH_{HI}$ and/or the low threshold $TH_{LO}$ based on the magnitude of the rectified voltage $V_R$.

Figure 3:
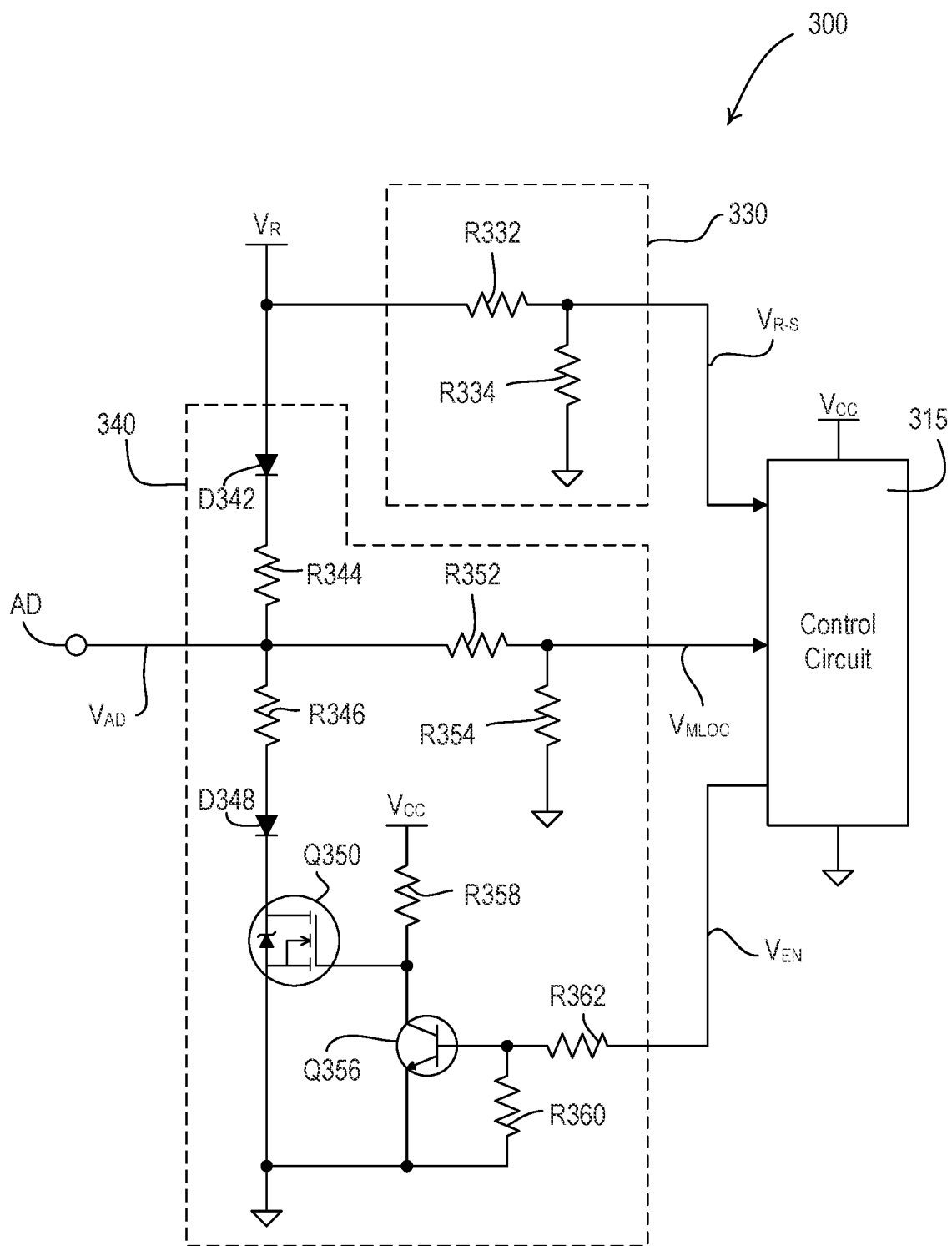
FIG. 3 is a simplified partial schematic diagram of another example load control device showing a multi-location circuit in greater detail.

FIG. 3 is a simplified partial schematic diagram of another example load control device 300 (e.g., the main dimmer 202 shown in FIG. 2) for controlling the amount of power delivered to an electrical load, such as a lighting load (e.g., the lighting load 208). The load control device 300 may comprise a control circuit 315 (e.g., the control circuit 215 of the main dimmer 202 shown in FIG. 2). The load control device 300 may comprise a multi-location circuit 340 (e.g., the multi-location circuit 240) coupled to an accessory-dimmer terminal AD which may be connected to an accessory control device (e.g., the accessory dimmer 204 shown in FIG. 2). The multi-location circuit 340 may be configured to receive a rectified voltage $V_R$ (e.g., which may be a rectified version of the voltage across the load control device 300) that may be generated by a rectified bridge (e.g., in a similar manner as the rectified voltage $V_R$ is generated in the main dimmer 202). The multi-location circuit 340 may be coupled to the accessory-dimmer terminal AD and may be configured to generate a multi-location signal $V_{MLOC}$ in response to an input signal received from the accessory control device coupled to the accessory-dimmer terminal AD. The control circuit 315 may be configured to sample the multi-location signal $V_{MLOC}$ (e.g., using an analog-to-digital converter) to determine a magnitude of the multi-location signal $V_{MLOC}$.

The load control device 300 may also comprise a scaling circuit 330 configured to receive the rectified voltage $V_R$ and generate a scaled rectified voltage $V_{R-S}$. The scaling circuit 330 may comprise, for example, a resistive divider including resistors R332, R334. For example, the resistor R332 may have a resistance of approximately 2.2 MΩ and the resistor R334 may have a resistance of approximately 22 KΩ.

The multi-location circuit 340 may comprise a diode D342, a first resistor R344, a second resistor R346, and a diode D348 that may be electrically coupled in series between the rectified voltage $V_R$ and circuit common. For example, the resistors R344, R346 may each have a resistance of approximately 51 kΩ. The diodes D342, D346 and the resistors R344, R346 may also be coupled in series with a controllable switch, such as a field effect transistor (FET) Q350. The junction of resistors R344, R346 may be coupled to the accessory-dimmer terminal AD, such that an accessory-dimmer voltage $V_{AD}$ may be produced at the junction of resistors R344, R346. For example, the accessory-dimmer voltage $V_{AD}$ may have a magnitude equal to the input signal received from the accessory control device coupled to the accessory-dimmer terminal AD (e.g., when one or more of the switches of the accessory control device is being actuated). The accessory-dimmer voltage $V_{AD}$ may be coupled to the control circuit 315 via a resistive divider including resistors R352, R354. For example, the resistor R352 may have a resistance of approximately 2.2 MΩ and the resistor R354 may have a resistance of approximately 22 kΩ. The multi-location signal $V_{MLOC}$ may be generated at the junction of the resistors R352, R354 and may be a scaled version of the accessory-dimmer voltage $V_{AD}$.

The control circuit 315 may generate an enable control signal $V_{EN}$ for enabling the multi-location circuit 340 (e.g., to cause the multi-location circuit 340 to generate the multi-location signal $V_{MLOC}$) and disabling the multi-location circuit 340 (e.g., to cause the multi-location circuit 340 to not generate the multi-location signal $V_{MLOC}$). The multi-location circuit 340 may comprise an NPN bipolar junction transistor (BJT) Q356 that includes an emitter coupled to circuit common and a collector coupled to the supply voltage $V_{CC}$ via a resistor R358. The junction of the transistor Q356 and the resistor R358 may be coupled to a gate of the FET Q350. A base of the transistor Q356 may be coupled to the emitter of the transistor Q356 through a resistor R360. The base of the transistor Q356 may receive the enable control signal $V_{EN}$ from the control circuit 315 via a resistor R360. When the control circuit 215 drives the enable control signal $V_{EN}$ low towards circuit common, the transistor Q356 may be non-conductive and the voltage at the gate of the FET Q350 may be pulled up towards the supply voltage $V_{CC}$, thus rendering the FET Q350 conductive. At this time, the diodes D342, D346 and the resistors R344, R346 may conduct current such that the multi-location signal $V_{MLOC}$ is generated. When the control circuit 215 drives the enable control signal $V_{EN}$ high towards the supply voltage $V_{CC}$, the transistor Q356 may be rendered conductive and the voltage at the gate of the FET Q350 may be pulled down towards circuit common thus rendering the FET Q350 non-conductive, such that the multi-location signal $V_{MLOC}$ is not generated.

Figure 4A:
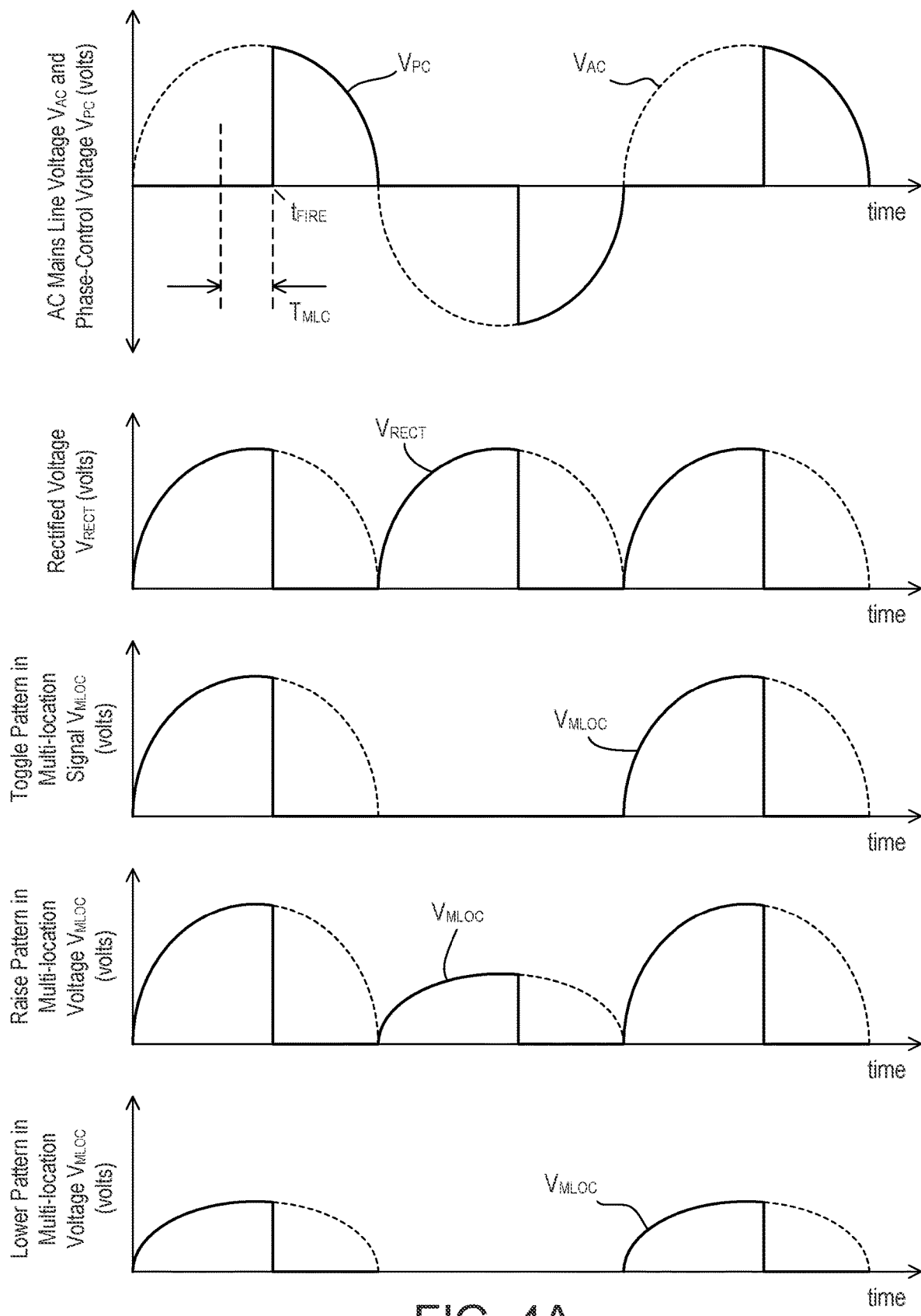
FIG. 4A shows simplified waveforms that illustrate the operation of a multi-location circuit the load control device of FIG. 3 when the load control device is using a forward phase-control dimming technique.

FIG. 4A shows simplified waveforms that illustrate the operation of the multi-location circuit 340 when the control circuit 315 is using the forward phase-control dimming technique to control a controllably conductive device of the load control device 300 (e.g., the controllably conductive device 210 of the main dimmer 200). The controllably conductive device may receive an AC mains line voltage $V_{AC}$ (e.g., shown by the dotted line in FIG. 4A), and the control circuit 315 may control the controllably conductive device to generate a phase-control voltage $V_{PC}$. Using the forward phase-control dimming technique, the control circuit 315 may render the controllably conductive device non-conductive at the beginning of each half cycle, and render the controllably conductive device conductive at a firing time $t_{FIRE}$ during the half cycle. The controllably conductive device may remain conductive for the rest of the half cycle. The control circuit 315 may adjust the firing time $t_{FIRE}$ during the half cycle to adjust the amount of power delivered to the lighting load and thus the intensity of the lighting load.

The rectified voltage $V_R$ may be a rectified version of the voltage across the load control device 300 and thus may have a magnitude approximately equal to the magnitude of the AC mains line voltage $V_{AC}$ when the controllably conductive device is non-conductive. If the control circuit 315 controls the controllably conductive device to be non-conductive for approximately the entire length of each of the half cycles (e.g., to turn the lighting load off), the rectified voltage $V_R$ may be approximately a rectified version of the AC mains line voltage $V_{AC}$ (e.g., as shown by a dotted line in FIG. 4A).

When the switches of the accessory control device (e.g., the switches 290, 292, 294 of the accessory dimmer 204) are open, the magnitude of the accessory-dimmer voltage $V_{AD}$ may be equal to half of the magnitude of the rectified voltage $V_R$, which may result in the multi-location signal $V_{MLOC}$ being in the idle state. When the toggle button is actuated to close the first switch 290, the magnitude of the accessory-dimmer voltage $V_{AD}$ may be approximately equal to the magnitude of the rectified voltage $V_R$ during the positive half cycles and approximately zero volts during the negative half cycles. Thus, the multi-location signal $V_{MLOC}$ may be in the high state during the positive half cycles and in the low state during the negative half cycles to generate a toggle pattern as shown in FIG. 4A. When the raise button is actuated to close the second switch 292, the magnitude of the accessory-dimmer voltage $V_{AD}$ may be approximately equal to the magnitude of the rectified voltage $V_R$ during the positive half cycles and approximately equal to half of the magnitude of the rectified voltage $V_R$ during the negative half cycles. Thus, the multi-location signal $V_{MLOC}$ may be in the high state during the positive half cycles and in the idle state during the negative half cycles to generate a raise pattern as shown in FIG. 4A. When the lower button is actuated to close the third switch 294, the magnitude of the accessory-dimmer voltage $V_{AD}$ may be approximately equal to half of the magnitude of the rectified voltage $V_R$ during the positive half cycles and approximately zero volts during the negative half cycles. Thus, the multi-location signal $V_{MLOC}$ may be in the idle state during the positive half cycles and in the low state during the negative half cycles to generate a lower pattern as shown in FIG. 4A.

The control circuit 315 may be configured to sample (e.g., periodically sample) the magnitude of the multi-location signal $V_{MLOC}$, for example, when the controllably conductive device is non-conductive and a voltage is produced across the load control device 300. The control circuit 315 may be configured to sample (e.g., periodically sample) the magnitude of the multi-location signal $V_{MLOC}$ during a multi-location sampling window $T_{LOC}$ (e.g., approximately 1.5 ms) before (e.g., immediately before) the firing time $t_{FIRE}$. For example, the control circuit 315 may be configured to sample the magnitude of the multi-location signal $V_{MLOC}$ ten times during the multi-location sampling window $T_{MLOC}$. After the multi-location sampling window $T_{MLOC}$ during each half cycle (e.g., and before the end of the half cycle), the control circuit 315 may process the samples from the multi-location sampling window $T_{MLOC}$ to determine the state of the multi-location signal $V_{MLOC}$ during the present half cycle. In the electronic off state (e.g., when the controllably conductive device is not rendered conductive each half cycle and the AC mains line voltage $V_{AC}$ may be developed across the load control device 300), the multi-location sampling window $T_{MLOC}$ may be located near the midpoint of each half cycle (e.g., when the magnitude of the rectified voltage is at or near a maximum level and determination of the states of the multi-location signal $V_{MLOC}$ may be more accurate).

At the end of each half cycle (e.g., after determining the states of the multi-location signal $V_{MLOC}$ of each pair of positive and negative half cycles), the control circuit 315 may process the determined states of the multi-location signal $V_{MLOC}$ of the previous positive and negative half cycles to determine the indicated pattern (e.g., a toggle pattern, a raise pattern, or a lower pattern) from the half cycle (e.g., from a portion of the half cycle). The control circuit 315 may determine the pattern of the multi-location signal over one or multiple half cycles. For example, after processing the states of the multi-location signal $V_{MLOC}$ in a predetermined number of half cycles, the control circuit 315 may process the determined patterns from each half cycle (e.g., from a portion of the half cycle) to determine if one of the buttons (e.g., the toggle button, the raise button, or the lower button of the accessory dimmer 204) is being actuated.

The control circuit 315 may be configured to determine the states of the multi-location signal $V_{MLOC}$ based on the magnitude of the rectified voltage $V_R$ during the half cycle. At the same time that control circuit 315 records each sample of the magnitude of the multi-location signal $V_{MLOC}$ during the multi-location sampling window $T_{MLOC}$, the control circuit 315 may sample the magnitude of the scaled rectified signal $V_{R-S}$ to determine the magnitude of the rectified voltage $V_R$. If the magnitude of the sample of the scaled rectified signal $V_{R-S}$ is less than a low magnitude threshold $V_{R-LIMIT}$, the control circuit 315 may not process the respective sample of the multi-location signal $V_{MLOC}$. For example, the low magnitude threshold $V_{R-LIMIT}$ may be a value that corresponds to magnitude of the rectified voltage $V_R$ of 50V. If the magnitude of the sample of the scaled rectified signal $V_{R-S}$ is greater than or equal to the low magnitude threshold $V_{R-LIMIT}$, the control circuit 315 may compare the magnitude of the respective sample of the multi-location signal $V_{MLOC}$ to high and/or low thresholds $TH_{HI}$, $TH_{LO}$. The values of the high and low thresholds $TH_{HI}$, $TH_{LO}$ may be based on the respective sample of the scaled rectified signal $V_{R-S}$ (e.g., that was recorded at the same time during the multi-location sampling window $T_{MLOC}$). For example, the control circuit 315 may set the high threshold $TH_{HI}$ based on the magnitude of the scaled rectified voltage $V_{R-S}$, e.g., $$TH_{HI}=V_{R-S}-V_{\Delta HI},$$

where $V_{\Delta HI}$ is a high threshold offset voltage (e.g., 18 V). In addition, the control circuit 315 may set the low threshold $TH_{LO}$ based on a minimum magnitude of the multi-location signal $V_{MLOC}$ (e.g., rather than the magnitude of the scaled rectified voltage $V_{R-S}$), e.g., $$TH_{LO}=V_{MIN}+V_{\Delta LO},$$

where $V_{\Delta LO}$ is a low threshold offset voltage (e.g., 12 V) and $V_{MIN}$ is the minimum magnitude of the multi-location signal $V_{MLOC}$ (e.g., 0 V).

The control circuit 315 may compare the magnitude of the each of the samples of the multi-location signal $V_{MLOC}$ recorded during the multi-location sampling window $T_{MLOC}$ to the high and/or low thresholds $TH_{HI}$, $TH_{LO}$, and count the number of samples that exceed or fall below the thresholds. The control circuit 315 may determine that the multi-location signal $V_{MLOC}$ is in the high state if a count of the samples that are above the high threshold $TH_{HI}$ exceeds a high-count threshold $TH_{HI-COUNT}$ e.g., approximately 4 samples out of 10 samples collected). The control circuit 315 may determine that the multi-location signal $V_{MLOC}$ is in the low state if a count of the samples that are below the low threshold $TH_{LO}$ exceeds a low-count threshold $TH_{LO-COUNT}$ (e.g., approximately 4 samples out of 10 collected samples). Otherwise, the control circuit 315 may determine that the multi-location signal $V_{MLOC}$ is in the idle state.

Figure 4B:
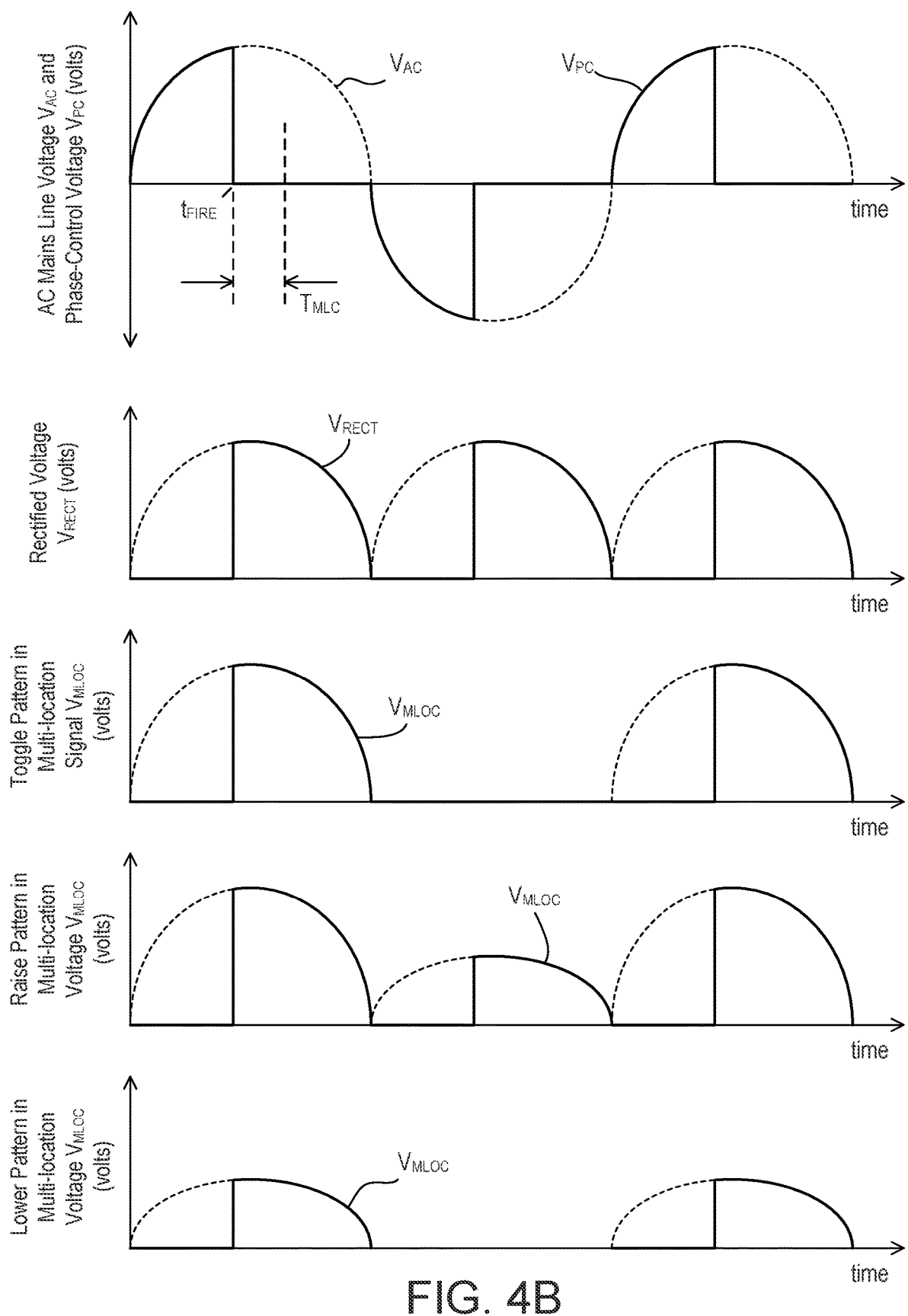
FIG. 4B shows simplified waveforms that illustrate the operation of a multi-location circuit the load control device of FIG. 3 when the load control device is using a reverse phase-control dimming technique.

FIG. 4B shows simplified waveforms that illustrate the operation of the multi-location circuit 340 when the control circuit 315 is using the reverse phase-control dimming technique to control the controllably conductive device of the load control device 300. The waveforms of FIG. 4B may be similar to those of FIG. 4A. Note, however, that the times at which the controllably conductive device is conductive each half cycle may be different. Using the reverse phase-control dimming technique, the control circuit 315 may render the controllably conductive device conductive at the beginning of each half cycle, and render the controllably conductive device non-conductive at a firing time $t_{FIRE}$ during the half cycle, after which the control circuit may maintain the controllably conductive device non-conductive for the rest of the half cycle.

The control circuit 315 may be configured to sample (e.g., periodically sample) the magnitude of the multi-location signal $V_{MLOC}$, for example, during a multi-location sampling window $T_{MLOC}$ (e.g., approximately 1.5 ms) after (e.g., immediately after) the firing time $t_{FIRE}$. After the multi-location sampling window $T_{MLOC}$ during each half cycle (e.g., and before the end of the half cycle), the control circuit 315 may process the samples from the multi-location sampling window $T_{MLOC}$ to determine the state of the multi-location signal $V_{MLOC}$ during the present half cycle (e.g., in a similar manner as described above when using the forward phase-control dimming technique). Similar to operation using the forward phase-control dimming technique, the multi-location sampling window $T_{MLOC}$ may be located near the midpoint of each half cycle in the electronic off state. At the end of each half cycle, the control circuit 315 may process the determined states of the multi-location signal $V_{MLOC}$ of the previous positive and negative half cycles to determine the indicated pattern from the half cycle. The control circuit 315 may be configured to determine the pattern of the multi-location signal $V_{MLOC}$ over one or multiple half cycles (e.g., over respective portions of the one or multiple half cycles). For example, after processing the states of the multi-location signal $V_{MLOC}$ in a predetermined number of half cycles, the control circuit 315 may process the determined patterns from each half cycle to determine if one of the buttons is being actuated.

It should be noted that although the examples above describe the multi-location sampling window $T_{MLOC}$ in specific relation to the firing time $t_{FIRE}$ within a half cycle (e.g., immediately before or after the firing time $t_{FIRE}$), the multi-location sampling window $T_{MLOC}$ may be moved away from the firing time $t_{FIRE}$ and/or may not be tied to the firing time $t_{FIRE}$ at all. For example, when the target intensity $L_{TRGT}$ of the load control device 300 is near the low-end intensity $L_{LE}$ (e.g., when the firing time $t_{FIRE}$ is between approximately 0% and 50% of the length of the half cycle), the multi-location sampling window $T_{MLOC}$ may be moved away from the firing time $t_{FIRE}$ and placed near approximately the midpoint of the half cycle.

Figure 5:
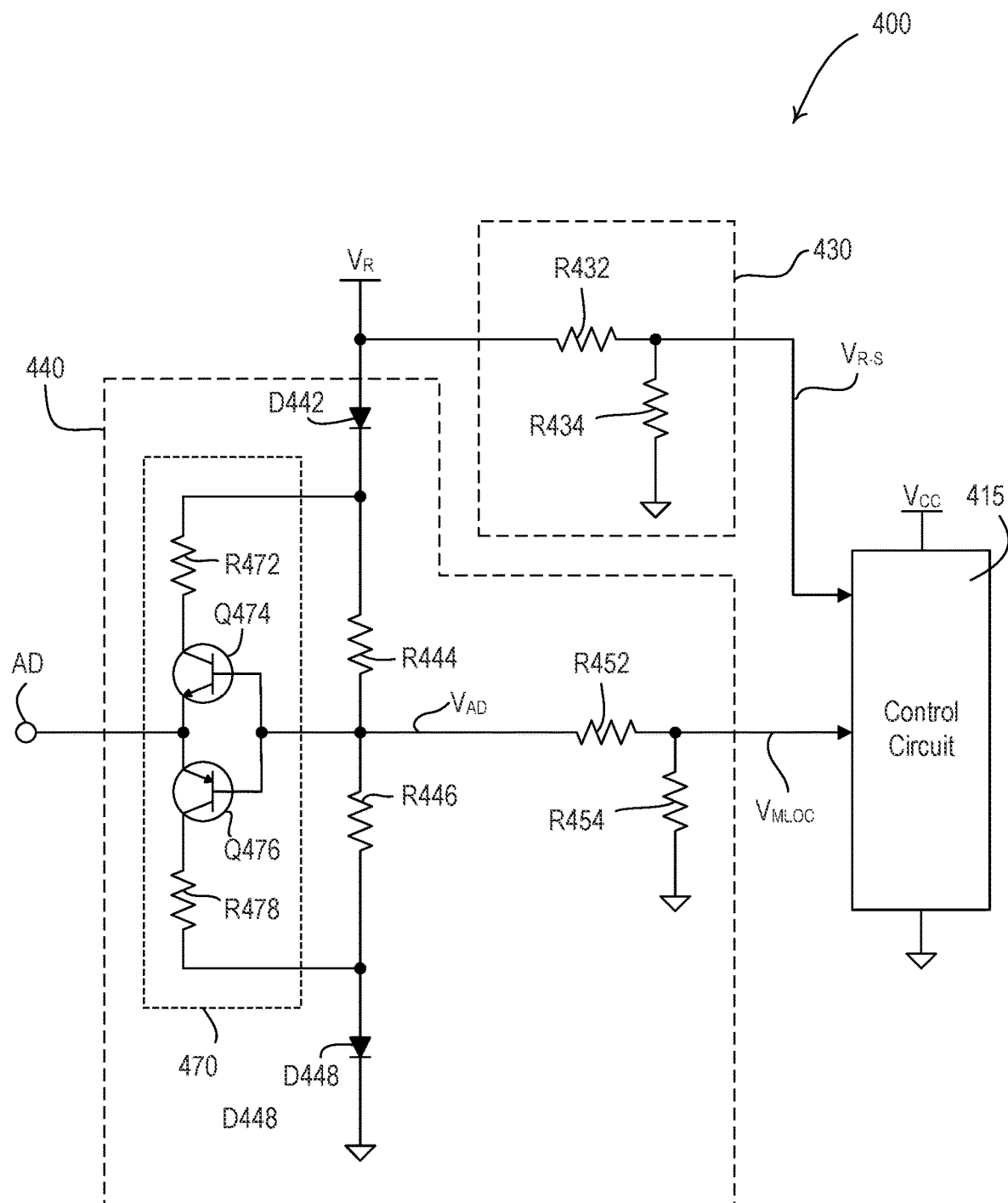
FIG. 5 is a simplified partial schematic diagram of another example load control device showing a multi-location circuit in greater detail.

FIG. 5 is a simplified partial schematic diagram of another example load control device 400 (e.g., the main dimmer 202 shown in FIG. 2) for controlling the amount of power delivered to an electrical load, such as a lighting load (e.g., the lighting load 208). The load control device 400 may comprise a control circuit 415 (e.g., the control circuit 215 of the main dimmer 202 shown in FIG. 2). The load control device 400 may comprise a multi-location circuit 440 (e.g., the multi-location circuit 240) coupled to an accessory-dimmer terminal AD which may be connected to an accessory control device (e.g., the accessory dimmer 204 shown in FIG. 2). The multi-location circuit 440 may be configured to receive a rectified voltage $V_R$ (e.g., which may be a rectified version of the voltage across the load control device 300) that may be generated by a rectified bridge (e.g., in a similar manner as the rectified voltage $V_R$ is generated in the main dimmer 202). The multi-location circuit 440 may be coupled to the accessory-dimmer terminal AD and may be configured to generate a multi-location signal $V_{MLOC}$ in response to an input signal received from the accessory-dimmer terminal AD. The control circuit 415 may be configured to sample the multi-location signal $V_{MLOC}$ (e.g., using an analog-to-digital converter) to determine a magnitude of the multi-location signal $V_{MLOC}$.

The load control device 400 may also comprise a scaling circuit 430 configured to receive the rectified voltage $V_R$ and generate a scaled rectified voltage $V_{R-S}$. The scaling circuit 430 may comprise, for example, a resistive divider including resistors R432, R434. For example, the resistor R432 may have a resistance of approximately 2.2 MΩ and the resistor R434 may have a resistance of approximately 22 kΩ.

The multi-location circuit 440 may comprise a diode D442, a first resistor R444, a second resistor R446, and a diode D448 that may all be electrically coupled in series between the rectified voltage $V_R$ and circuit common. For example, the resistors R444, R446 may each have a resistance of approximately 470 kΩ. The series combination of the diode D442, the first resistor R444, the second resistor R446, and the diode D448 may receive the rectified voltage $V_R$, such that an accessory-dimmer voltage $V_{AD}$ may be produced at the junction of resistors R444, R446. The accessory-dimmer voltage $V_{AD}$ may be coupled to the control circuit 415 via a resistive divider including resistors R452, R454. For example, the resistor R452 may have a resistance of approximately 2.2 MΩ and the resistor R454 may have a resistance of approximately 22 kΩ. The multi-location signal $V_{MLOC}$ may be generated at the junction of the resistors R452, R454 and may be a scaled version of the accessory-dimmer voltage $V_{AD}$.

The accessory-dimmer voltage $V_{AD}$ may be coupled to the accessory-dimmer terminal AD via a buffer circuit 470. The buffer circuit 470 may operate to provide increased noise immunity to parasitics of the accessory-dimmer line coupled to the accessory-dimmer terminal AD (e.g., due to parasitic capacitance of the accessory-dimmer line 109). When any of the switches of the accessory control device are closed (e.g., when the accessory control device is generating the input signal), the buffer circuit may operate to allow the magnitude of the accessory-dimmer voltage $V_{AD}$ to be adjusted in response to the input signal generated by the accessory device. When the switches of the accessory control device are open (e.g., when the accessory control device is not generating the input signal), the buffer circuit may operate to discharge voltages produced by any parasitic capacitance of the accessory dimmer line.

The buffer circuit 470 may comprise a first resistor R472, an NPN bipolar junction transistor Q474, a PNP bipolar junction transistor Q476, and a second resistor R478. For example, the first and second resistors R472, R478 may each have a resistance of approximately 100 kΩ. The bases of the NPN bipolar junction transistor Q474 and the PNP bipolar junction transistor Q476 may be electrically coupled together to the junction of the resistors R444, R446. The emitters of the NPN bipolar junction transistor Q474 and the PNP bipolar junction transistor Q476 may be electrically coupled together to the accessory-dimmer terminal AD. The collector of the NPN bipolar junction transistor Q474 may be electrically coupled to the junction of the diode D442 and the first resistor R444 of the multi-location circuit 440 via the first resistor R472. The collector of the PNP bipolar junction transistor Q476 may be electrically coupled to the junction of the second resistor R446 and the diode D448 of the multi-location circuit 440 via the second resistor R478.

The multi-location circuit 440 may generate the toggle pattern, the raise pattern, the lower pattern of the multi-location signal $V_{MLOC}$ (e.g., as shown in FIGS. 4A and 4B) in response to actuations of the switches of the accessory control device (e.g., the switches 290, 292, 294 of the accessory dimmer 204). When the switches of the accessory control device are open, the NPN bipolar junction transistor Q474 and the PNP bipolar junction transistor Q476 of the buffer circuit 470 may be off (e.g., non-conductive), and the magnitude of accessory-dimmer voltage $V_{AD}$ may be equal to half of the magnitude of the rectified voltage $V_R$, which may result in the multi-location signal $V_{MLOC}$ being in the idle state.

When any of the switches of the accessory control device are closed, the accessory-dimmer voltage $V_{AD}$ may be approximately equal to the AC mains line voltage $V_{AC}$ generated by the AC power source (e.g., the AC power source 106, 206) depending on which of the switches is closed and/or the present half cycle (e.g., positive or negative half cycle). At this time, the NPN bipolar junction transistor Q474 and/or the PNP bipolar junction transistor Q476 may be driven into the saturation region (e.g., depending on which of the switches is closed and/or the present half cycle). For example, during the positive half cycles when the first switch 290 and/or the second switch 292 are closed, the PNP bipolar junction transistor Q476 may be driven into the saturation region, such that the junction of the resistors R444, R446 may be coupled to the accessory-dimmer terminal AD through the emitter-base junction of the transistor Q476. During the negative half cycles when the first switch 290 and/or the third switch 294 are closed, the NPN bipolar junction transistor Q474 may be driven into the saturation region, such that the junction of the resistors R444, R446 may be coupled to the accessory-dimmer terminal AD through the base-emitter junction of the transistor Q474. Since either the NPN bipolar junction transistor Q474 or the PNP bipolar junction transistor Q476 may be driven into the saturation region in these conditions, the magnitude of the accessory-dimmer voltage $V_{AD}$ may be responsive to the input signal generated by the accessory control device, such that the multi-location circuit 440 may generate the toggle pattern, the raise pattern, the lower pattern of the multi-location signal $V_{MLOC}$ in response to actuations of the switches 290, 292, 294 of the accessory dimmer 204 (e.g., as described above with reference to FIGS. 4A and 4B).

As previously mentioned, the electrical wiring coupled to the accessory-dimmer terminal AD (e.g., length and/or capacitance of the electrical wiring between the main dimmer 202 and the accessory dimmer 204) and/or other conditions in the load control system 200 may cause abnormal adjustments and/or shifts in the magnitude of the voltage at the accessory-dimmer terminal AD (e.g., due to capacitance of the lighting load and/or electrical wiring) when the switches of the accessory control device are open. If the parasitic capacitance of the electrical wiring coupled to the accessory-dimmer terminal AD begins to charge and cause the magnitude of the accessory-dimmer voltage $V_{AD}$ to change when the switches of the accessory control device are open, the NPN bipolar junction transistor Q474 and/or the PNP bipolar junction transistor Q476 may be driven into the linear region, which may allow the parasitic capacitance to discharge through the respective transistor. For example, if the magnitude of the voltage at the accessory dimmer terminal AD begins to increase above the magnitude of the accessory-dimmer voltage $V_{AD}$ (e.g., half of the rectified voltage $V_R$) when the switches of the accessory control device are open, the PNP bipolar junction transistor may operate in the linear region and discharge the parasitic capacitance through the second resistor R478. Since the NPN bipolar junction transistor Q474 and the PNP bipolar junction transistor Q476 may each be operating in the linear region at this time, the magnitude of the voltage at the accessory-dimmer terminal AD may not affect the magnitude of the accessory-dimmer voltage $V_{AD}$ and thus the magnitude of the multi-location signal $V_{MLOC}$. Accordingly, the multi-location circuit 440 may have an increased noise immunity to parasitics of the electrical wiring coupled to the accessory-dimmer terminal AD.

Figure 6:
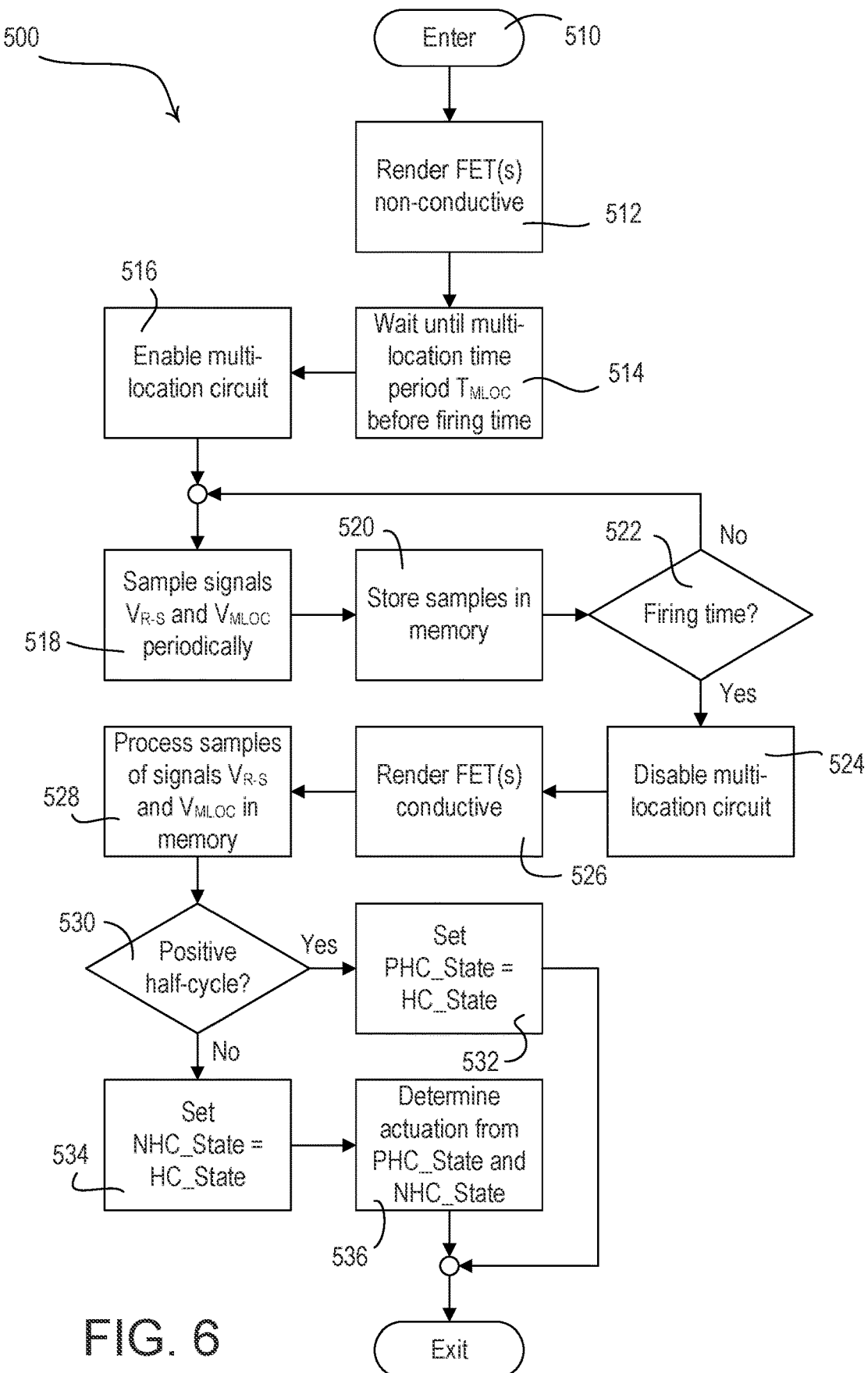
FIGS. 6 and 7 show simplified flowcharts of example control procedures that may be executed by a control circuit of a load control device.

FIG. 6 is a simplified flowchart of an example control procedure 500 that may be executed by a control circuit of a load control device (e.g., the control circuit 215 of the main dimmer 202 shown in FIG. 2, the control circuit 315 of the load control device 300 shown in FIG. 3, and/or the control circuit 415 of the load control device 400 shown in FIG. 5) when using the forward phase-control dimming technique. The control circuit may control a controllably conductive device (e.g., the controllably conductive device 210 of the main dimmer 202) using the forward phase-control dimming technique to adjust the amount of power delivered to a lighting load and thus the intensity of the lighting load. The control circuit may start the procedure 500 at 510 during one or more half cycles (e.g., during each half cycle) of the AC mains line voltage, for example, around the zero-crossing point of the AC mains line voltage (e.g., at the beginning of a current half cycle or the end of a previous half cycle). Upon starting the procedure 500, the control circuit may, at 512 (e.g., at the beginning of a current half cycle or the end of a previous half cycle), render the controllably conductive device non-conductive. In examples, the control circuit may not need to perform the action of 512. For instance, if the controllably conductive device comprises a thyristor such as a triac, the triac may turn itself off at the end of the previous half cycle. In such cases, the control circuit may skip the operation of 512.

With the controllably conductive device in the non-conductive state, the control circuit may, at 514, wait until a preconfigured time period before enabling a multi-location circuit (e.g., the multi-location circuit 240 in FIG. 2 or the multi-location circuit 340 in FIG. 3) at 516. The preconfigured time period may correspond to a multi-location signal sampling time window $T_{MLOC}$ and the firing time may be determined by the control circuit based on a target intensity of the lighting load. The multi-location circuit may be enabled through an enable control signal (e.g., the enable control signal $V_{EN}$ described herein) generated by the control circuit. Once enabled, the multi-location circuit may receive an accessory-dimmer voltage $V_{AD}$ from an accessory dimmer, and output a multi-location signal $V_{MLOC}$ in response to the accessory-dimmer voltage $V_{AD}$.

Within the multi-location signal sampling time window $T_{MLOC}$, the control circuit may periodically sample and store a rectified voltage signal (e.g., the scaled rectified voltage VRS) and the multi-location signal $V_{MLOC}$. For example, at 518, the control circuit may sample the scaled rectified voltage $V_{R-S}$ and the multi-location signal $V_{MLOC}$, e.g., using an ADC, and, at 520, the control circuit may store the collected samples in memory. At 522, the control circuit may check whether the firing time for the current half cycle has arrived. If the firing time has not yet arrived, the control circuit may repeat steps 518 and 520. If the firing time has arrived, the control circuit may disable the multi-location circuit (e.g., via the enable control signal $V_{EN}$) at 524 and render the controllably conductive device conductive at 526 so that a load current may be conducted through the lighting load. At 528, the control circuit may process the samples of $V_{R-S}$ and $V_{MLOC}$ stored in memory to determine a state of the multi-location signal $V_{MLOC}$. For example, the control circuit may use similar techniques as those described with reference to FIG. 4A to determine whether the multi-location signal $V_{MLOC}$ is in the high state, low state, or idle state. The control circuit may further determine, at 530, whether the processed samples belong to a positive half cycle or a negative half cycle (e.g., whether the current half cycle is a positive half cycle). If the samples belong to a positive half cycle, the control circuit may, at 532, set a positive half cycle state of the multi-location signal $V_{MLOC}$ to the state determined at 528. If the samples belong to a negative half cycle, the control circuit may, at 534, set a negative half cycle state of the multi-location signal $V_{MLOC}$ to the state determined at 528.

After step 532 or 534, the control circuit may exit the procedure 500 (e.g., if both positive half cycle and negative half cycle states of the multi-location signal $V_{MLOC}$ have not been determined yet), or the control circuit may determine, at 536, an actuation state of the accessory dimmer (e.g., if both positive half cycle and negative half cycle states of the multi-location signal $V_{MLOC}$ have been determined). In the latter case, the control circuit may determine the actuation state of the accessory dimmer based on a pattern indicated in the positive half cycle state and negative half cycle state of the multi-location signal $V_{MLOC}$. For example, as shown in FIG. 6, if the current half cycle is a positive half cycle, the control circuit may exit the procedure 500 after 532 and the procedure may be executed again in the next half cycle (e.g., a negative half cycle) to determine a negative half cycle state of the multi-location signal $V_{MLOC}$. If the current half cycle is a negative half cycle, the control circuit may continue to 536 to determine the actuation state of the accessory dimmer based on positive and negative half cycle states of the multi-location signal $V_{MLOC}$ (assuming both half cycle states have been determined). Although step 536 is shown in FIG. 6 as being executed in a negative half cycle, a skilled person in the art would appreciate that step 536 could be executed during either a negative half cycle or a positive half cycle depending on the initial starting point of the procedure 500 (e.g., depending on whether the procedure 500 was initially started in a positive half cycle or a negative half cycle).

Figure 7:
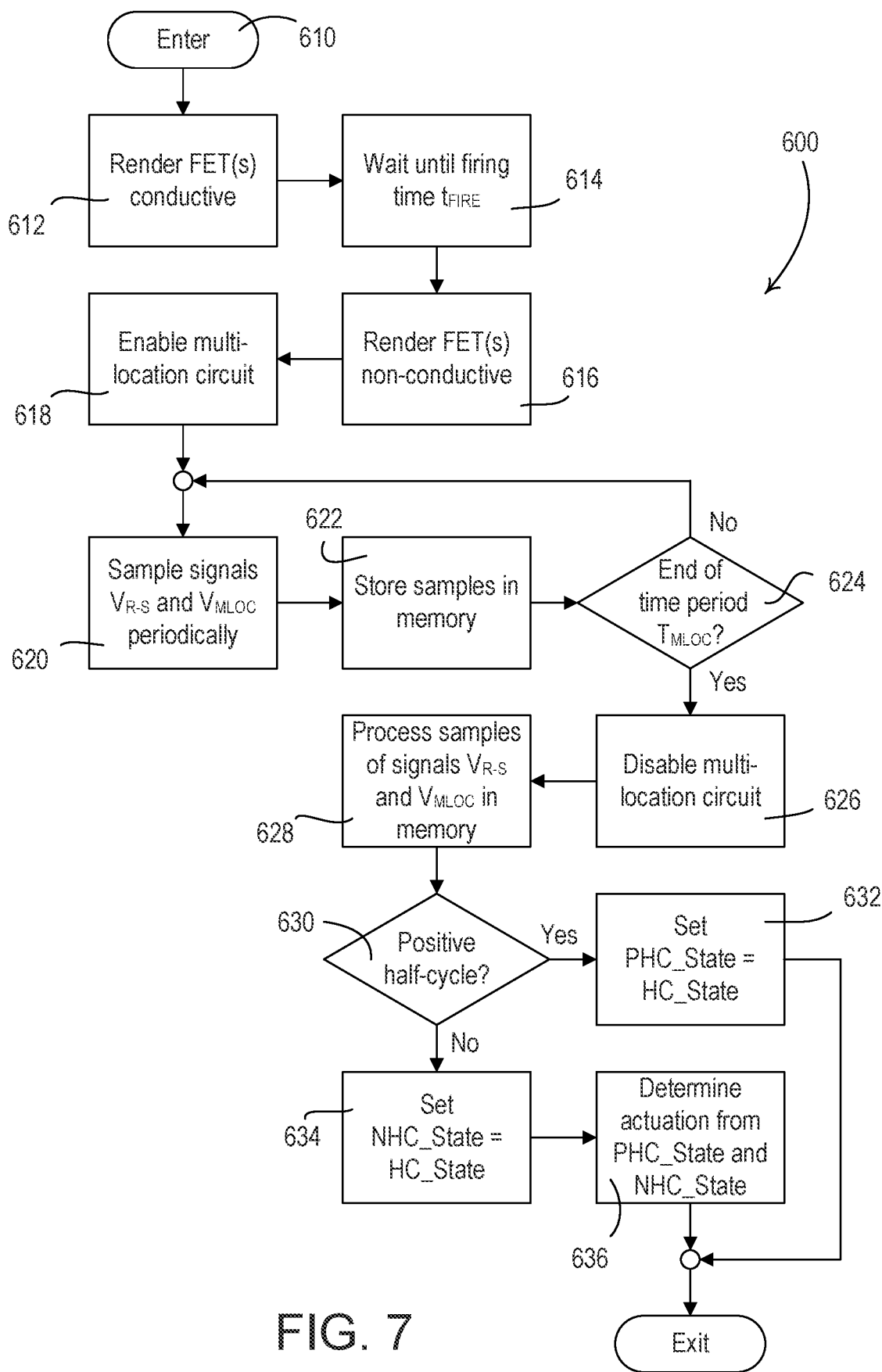

FIG. 7 is a simplified flowchart of an example control procedure 600 that may be executed by a control circuit of a load control device (e.g., the control circuit 215 of the main dimmer 202 shown in FIG. 2, the control circuit 315 of the load control device 300 shown in FIG. 3, and/or the control circuit 415 of the load control device 400 shown in FIG. 5) when using the reverse phase-control dimming technique. The control circuit may control a controllably conductive device (e.g., the controllably conductive device 210 of the main dimmer 202) using the reverse phase-control dimming technique to adjust the amount of power delivered to a lighting load and thus the intensity of the lighting load. The control circuit may start the procedure 600 at 610 during one or more half cycles (e.g., during each half cycle) of the AC mains line voltage, for example, around the zero-crossing point of the AC mains line voltage (e.g., at the beginning of a current half cycle or the end of a previous half cycle). Upon starting the procedure 600, the control circuit may, at 612 (e.g., at the beginning of a current half cycle or the end of a previous half cycle), render the controllably conductive device conductive.

With the controllably conductive device in the conductive state, the control circuit may, at 614, wait until a firing time before rendering the controllably conductive device non-conductive at 616. The firing time may be determined by the control circuit based on a target intensity of the lighting load. At 618, the control circuit may enable a multi-location circuit (e.g., the multi-location circuit 240 in FIG. 2 or the multi-location circuit 340 in FIG. 3) through an enable control signal (e.g., the enable control signal $V_{EN}$ described herein). Once enabled, the multi-location circuit may receive an accessory-dimmer voltage $V_{AD}$ from an accessory dimmer, and output a multi-location signal $V_{MLOC}$ in response to the accessory-dimmer voltage $V_{AD}$. The control circuit may then periodically sample and store a rectified voltage signal (e.g., the scaled rectified voltage $V_{R-S}$) and the multi-location signal $V_{MLOC}$ with a subsequent preconfigured time period (e.g., which may correspond to a multi-location signal sampling time window $T_{MLOC}$). For example, at 620, the control circuit may sample the rectified voltage signal (e.g., the scaled rectified voltage $V_{R-S}$ and the multi-location signal $V_{MLOC}$, e.g., using an ADC. At 622, the control circuit may store the collected samples in memory.

At 624, the control circuit may check whether the sampling time window $T_{MLOC}$ has expired. If the time window has not expired, the control circuit may repeat steps 620 and 622. If the time window has expired, the control circuit may disable the multi-location circuit (e.g., through the enable control signal $V_{EN}$) at 626 and process the samples of $V_{R-S}$ and $V_{MLOC}$ from memory at 628 to determine the state of the multi-location signal $V_{MLOC}$. For example, the control circuit may use similar techniques as those described with reference to FIG. 4B to determine whether the multi-location signal $V_{MLOC}$ is in the high state, low state, or idle state. The control circuit may further determine, at 630, whether the processed samples belong to a positive half cycle or a negative half cycle (e.g., whether the current half cycle is a positive half cycle). If the samples belong to a positive half cycle, the control circuit may, at 632, set a positive half cycle state of the multi-location signal $V_{MLOC}$ to the state determined at 628. If the samples belong to a negative half cycle, the control circuit may, at 634, set a negative half cycle state of the multi-location signal $V_{MLOC}$ to the state determined at 628.

After step 632 or 634, the control circuit may exit the procedure 600 (e.g., if both positive half cycle and negative half cycle states of the multi-location signal $V_{MLOC}$ have not been determined yet), or the control circuit may determine, at 636, an actuation state of the accessory dimmer (e.g., if both positive half cycle and negative half cycle states of the multi-location signal $V_{MLOC}$ have been determined). In the latter case, the control circuit may determine the actuation state of the accessory dimmer based on a pattern indicated in the positive half cycle state and negative half cycle state of the multi-location signal $V_{MLOC}$. For example, as shown in FIG. 7, if the current half cycle is a positive half cycle, the control circuit may exit the procedure 600 after 632 and the procedure may be executed again in the next half cycle (e.g., a negative half cycle) to determine a negative half cycle state of the multi-location signal $V_{MLOC}$. If the current half cycle is a negative half cycle, the control circuit may continue to 636 to determine the actuation state of the accessory dimmer based on positive and negative half cycle states of the multi-location signal $V_{MLOC}$ (assuming both half cycle states have been determined). Although step 636 is shown in FIG. 7 as being executed in a negative half cycle, a skilled person in the art would appreciate that step 636 could be executed during either a negative half cycle or a positive half cycle depending on the initial starting point of the procedure 600 (e.g., depending on whether the procedure 600 was initially started in a positive half cycle or a negative half cycle).

Figure 8:
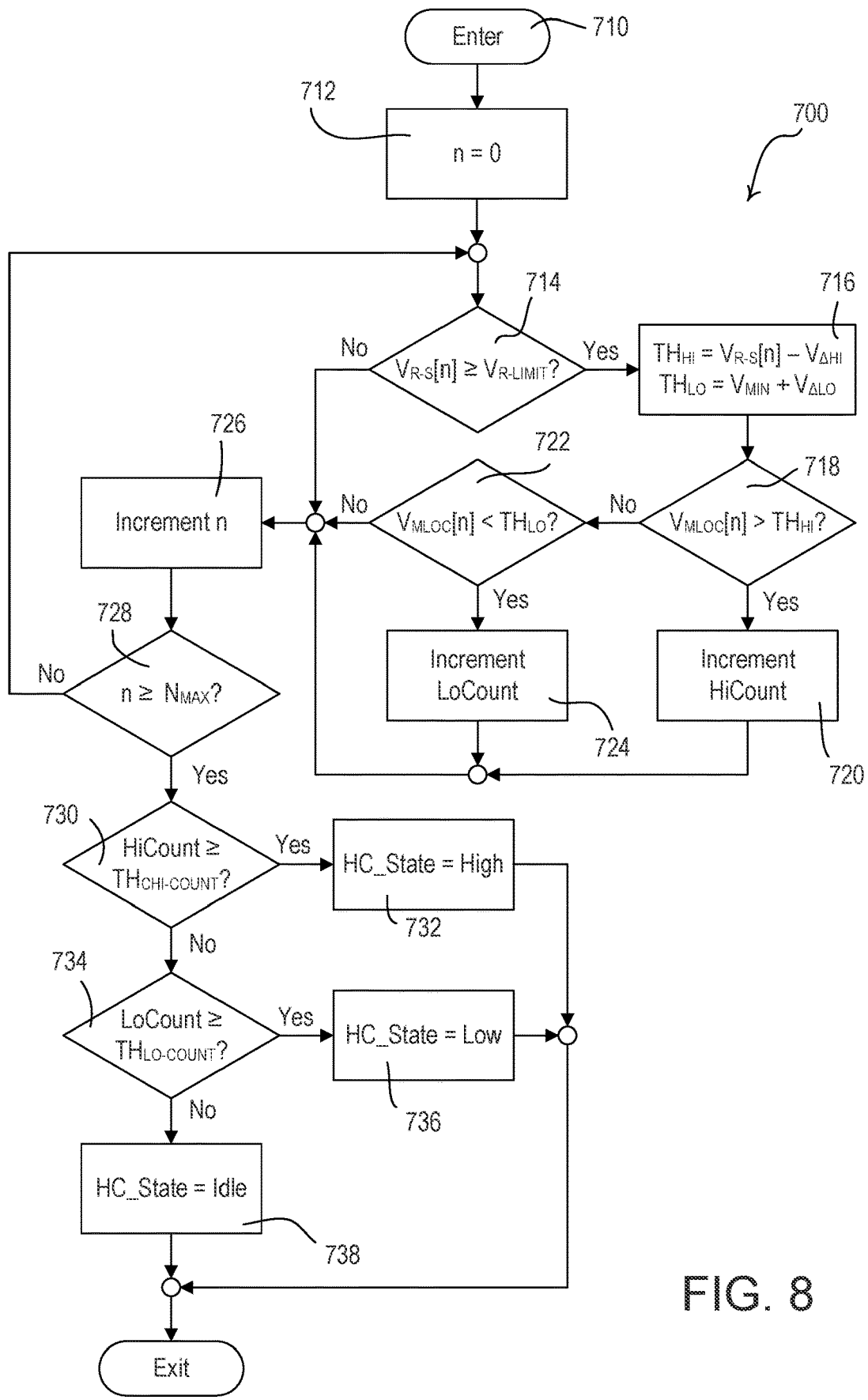
FIG. 8 is a simplified flowchart of an example multi-location processing procedure that may be executed by a control circuit of a load control device.

FIG. 8 is a simplified flowchart of an example multi-location processing procedure 700 that may be executed by a control circuit of a load control device (e.g., the control circuit 215 of the main dimmer 202 shown in FIG. 2, the control circuit 315 of the load control device 300 shown in FIG. 3, and/or the control circuit 415 of the load control device 400 shown in FIG. 5). The procedure 700 may be executed by the control circuit to determine the state of a multi-location signal (e.g., the multi-location signal $V_{MLOC}$) so as to determine the corresponding actuation of an accessory dimmer. For example, the procedure 700 may be executed by the control circuit at step 528 shown in FIG. 6 or at step 628 shown in FIG. 7 to determine whether the multi-location signal $V_{MLOC}$ is in the high state, low state, or idle state. The control circuit may start the procedure 700 at 710. At 712, the control circuit may initialize a variable n (e.g., set the value of n to 0) and use n to step through a plurality of samples collected during a half cycle of the AC mains line voltage. At 714, the control circuit may take a sample $V_{R-S}[n]$ of a scaled version of a rectified voltage (e.g., the scaled rectified voltage $V_{R-S}$ described herein) and determine whether the magnitude of the sample $V_{R-S}[n]$ exceeds a predetermined threshold $V_{R-LIMIT}$ (e.g., $V_{R-LIMIT}$ may represent a lower limit for the scaled rectified voltage and may be approximately equal to 50V). If the magnitude of the sample $V_{R-S}[n]$ is less than the predetermined threshold $V_{R-LIMIT}$, the control circuit may skip a current sample of the multi-location signal $V_{MLOC}$ and proceed to 726. If the magnitude of the sample $V_{R-S}[n]$ is equal to or greater than the predetermined threshold $V_{R-LIMIT}$, the control circuit may, at 716, adjust a high threshold $TH_{HI}$ and/or a low threshold $TH_{LO}$ based on the magnitude of the sample $V_{R-S}[n]$ in preparation for processing a current sample of the multi-location signal $V_{MLOC}$.

The high threshold $TH_{HI}$ and/or the low threshold $TH_{LO}$ may be used to determine the state of the multi-location signal $V_{MLOC}$, and the control circuit may adjust the threshold values as follows: $TH_{HI}=V_{R-S}[n]-V_{\Delta HI}$, where $V_{\Delta HI}$ is a high threshold offset voltage (e.g., 18 V), and $TH_{LO}=V_{MIN}+V_{\Delta LO}$, where $V_{\Delta LO}$ is a low threshold offset voltage (e.g., 12 V) and $V_{MIN}$ is the minimum magnitude of the multi-location signal $V_{MLOC}$ (e.g., 0 V). Once the high and low thresholds $TH_{HI}$ and $TH_{LO}$ have been determined, the control circuit may compare a sample $V_{MLOC}[n]$ of the multi-location signal to the high threshold $TH_{HI}$ at 718 to determine whether the sample indicates that the multi-location signal $V_{MLOC}$ is in a high state (e.g., whether $V_{MLOC}[n]>TH_{HI}$). If the magnitude of the multi-location signal sample $V_{MLOC}[n]$ is greater than the high threshold $TH_{HI}$, the control circuit may increase a count of the multi-location signal samples that are in the high state at 720 and may proceed to 726. If the magnitude of the multi-location signal sample $V_{MLOC}[n]$ is not greater than the high threshold $TH_{HI}$, the control circuit may further compare the multi-location signal sample $V_{MLOC}[n]$ to the low threshold $TH_{LO}$ at 722 to determine whether the sample indicates that the multi-location signal $V_{MLOC}$ is in a low state (e.g., whether $V_{MLOC}[n]<TH_{LO}$). If the magnitude of the multi-location signal sample $V_{MLOC}[n]$ is less than the low threshold $TH_{LO}$, the control circuit may increase a count of the multi-location signal samples that are in the low state at 724. If the magnitude of the multi-location signal sample $V_{MLOC}[n]$ is equal to or greater than the low threshold $TH_{LO}$, the control circuit may proceed to 726.

At 726, the control circuit may increment the value of n and take another sample of the multi-location signal sample $V_{MLOC}[n]$. At 728, the control circuit may compare the value of n to a predetermined maximum value $N_{MAX}$ that represents the number of samples of the multi-location signal $V_{MLOC}$ recorded during the current half cycle (e.g., $N_{MAX}$ may be approximately equal to 10). If the value of n is less than the predetermined maximum value $N_{MAX}$, the control circuit may return to 714 to repeat steps 714-724. If the value of n is equal to or greater than the predetermined maximum value $N_{MAX}$, the control circuit may determine, at 730, whether the count of multi-location signal samples that are in the high state has reached or exceeded a predetermined threshold $TH_{HI-COUNT}$. If the high state count has reached or exceeded the threshold $TH_{HI-COUNT}$, the control circuit may set the state of the multi-location signal $V_{MLOC}$ to the high state at 732. If the high state count is less than the threshold $TH_{HI-COUNT}$, the control circuit may further determine, at 734, whether the count of multi-location signal samples that are in the low state has reached or exceeded a predetermined threshold $TH_{LO-COUNT}$. If the low state count has reached or exceeded the threshold $TH_{LO-COUNT}$, the control circuit may set the state of the multi-location signal $V_{MLOC}$ to the low state at 736. If the high state count is less than the threshold $TH_{HI-COUNT}$ and the low state count is less than the threshold $TH_{LO-COUNT}$, the control circuit may set the state of the multi-location signal $V_{MLOC}$ to the idle state at 738. After 732, 736 or 738, the control circuit may exit the procedure 700.

It should be noted that while the multiple-location load control systems described herein (e.g., multiple-location load control system 100 and/or the load control system 200) have been described as including a main dimmer (e.g., the main dimmers 102, 202) connected to an accessory dimmer (e.g., the accessory dimmers 104, 204) that has a momentary mechanical tactile switch (e.g., the switches 290, 292, 294), the main dimmer could also be connected to maintained switches (e.g., standard light switches). For example, when the main dimmer 202 of the multiple-location load control system 200 is installed to replace a first three-way switch in a three-way switch system, the second three-way switch may be kept in the multiple-location load control system rather than replacing the second three-way switch with an accessory device. The second three-way switch may be re-wired, such that the AC mains line voltage $V_{AC}$ or the phase-control voltage $V_{PC}$ bypass the second three-way switch, and the second three-way switch is connected between the accessory dimmer terminal AD of the main dimmer 202 and the AC mains line voltage $V_{AC}$ or the phase-control voltage $V_{PC}$. As a result, the second three-way switch may be configured to connect and disconnect the AC mains line voltage $V_{AC}$ or the phase-control voltage $V_{PC}$ from the accessory dimmer terminal AD of the main dimmer 202 in response to actuations of a toggle actuator of the second three-way switch. For example, the multi-location circuit 240 may generate (e.g., continuously generate) a toggle pattern (e.g., as shown in FIGS. 4A and 4B) when the second three-way switch is closed and is coupling the AC mains line voltage $V_{AC}$ or the phase-control voltage $V_{PC}$ to the accessory dimmer terminal AD. In addition, the multi-location circuit 240 may control the multi-location signal $V_{MLOC}$ to the idle state when the second three-way switch is open. The main dimmer 202 may be configured to determine when the toggle actuator of the second three-way switch has been actuated in response to a change of state of the accessory-dimmer voltage $V_{AD}$ at the accessory dimmer terminal AD. The control circuit 215 of the main dimmer 202 may be configured to toggle the lighting load 206 on and off in response to actuations of the toggle actuator of the second three-way switch (e.g., the control circuit may not be configured to adjust the intensity of the lighting load in response to the second three-way switch). An example of a dimmer that is responsive to momentary and maintained switches is described in greater detail in commonly-assigned U.S. Pat. No. 7,247,999, issued Jul. 24, 2007, entitled DIMMER FOR USE WITH A THREE-WAY SWITCH, the entire disclosure of which is hereby incorporated by reference.

Although features and elements are described herein in particular combinations, each feature or element can be used alone or in any combination with the other features and elements. For example, the functionality described herein may be described as being performed by a load control device, but may be similarly performed by a hub device or a network device. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

The invention claimed is:
1. An electrical load controller, comprising:
   a controllably conductive device;
   multi-location circuitry to receive a signal from an accessory electrical load controller; and control circuitry operatively coupled to the controllably conductive device and communicatively coupled to the multi-location circuitry, the control circuitry to:
  transition the controllably conductive device between conductive and non-conductive states during each half-cycle of an applied AC voltage to control power delivered to an electrical load;
  enable the multi-location circuitry to receive a signal from the accessory electrical load controller for at least a portion of the cycle when the controllably conductive device is in the non-conductive state;
  receive, from the multi-location circuitry data representative of one of a plurality of patterns in a signal received from the accessory load controller, the received pattern indicative of a user command received as an input by the accessory load controller; and
  responsive to receipt of the data representative of the detected pattern, selectively adjust a duration of the conductive state of the controllably conductive device based on the user command received by the accessory load controller.

2. The load controller of claim 1 wherein to receive, from the multi-location circuitry data representative of one of a plurality of patterns, the control circuitry to further:
  receive, from the multi-location circuitry data representative of one of the following patterns:
    a first pattern indicative of a request to decrease the power provided by the controllably conductive device;
    a second pattern indicative of a user request to increase the power output provided by the controllably conductive device; and
    a third pattern indicative of a user request to terminate the power output provided by the controllably conductive device.

3. The load controller of claim 1 wherein to receive the data representative of one of the plurality of patterns in the signal received from the accessory load controller, the control circuitry to further:
  receive, from the multi-location circuitry data representative of one of a plurality of patterns in a signal received from the accessory load controller, the received one of the plurality of patterns received over a plurality of cycle portions when the controllably conductive device is in the non-conductive state.

4. The load controller of claim 1 wherein to enable the multi-location circuitry to receive the signal from the accessory electrical load controller for at least the portion of the cycle when the controllably conductive device is in the non-conductive state, the control circuitry to further:
  enable the multi-location circuitry after expiration of a delay period commencing with the transition of the controllably conductive device between the conductive and the non-conductive states.

5. An electrical load control method to control the power delivered to an electrical load, the method comprising:
  transitioning, by load control circuitry, a controllably conductive device coupled between an AC voltage source and the electrical load between conductive and non-conductive states during each half-cycle of the applied AC voltage to control power delivered to an electrical load;
  enabling, by the load control circuitry, multi-location circuitry to receive a signal from an accessory electrical load controller for at least a portion of the AC voltage cycle when the controllably conductive device is in the non-conductive state;
  receiving, by the load control circuitry from the multi-location circuitry, data representative of a pattern in a signal received from the accessory load controller, the pattern indicative of a user command received as an input by the accessory load controller; and
  adjusting, by the load control circuitry, a duration of the conductive state of the controllably conductive device based on the user command received by the accessory load controller responsive to receipt of the data representative of the detected pattern.

6. The method of claim 5 wherein receiving the data representative of the pattern in the signal received from the accessory load controller, the pattern indicative of the user command received as the input by the accessory load controller, further comprises:
  receiving, by the load control circuitry from the multi-location circuitry, data representative of one of the following patterns:
    a first pattern indicative of a request to decrease the power provided by the controllably conductive device;
    a second pattern indicative of a user request to increase the power output provided by the controllably conductive device; and
    a third pattern indicative of a user request to terminate the power output provided by the controllably conductive device.

7. The method of claim 5 wherein receiving the data representative of the pattern in the signal received from the accessory load controller, the pattern indicative of the user command received as the input by the accessory load controller, further comprises:
  receiving, from the multi-location circuitry, the data representative of one of a plurality of patterns in the signal received from the accessory load controller, the received one of the plurality of patterns received over a plurality of cycle portions when the controllably conductive device is in the non-conductive state.

8. The load controller of claim 1 wherein enabling the multi-location circuitry to receive the signal from the accessory electrical load controller for at least the portion of the AC voltage cycle when the controllably conductive device is in the non-conductive state, further comprises:
  enabling the multi-location circuitry after expiration of a delay period commencing with the transition of the controllably conductive device between the conductive and the non-conductive states.

9. A non-transitory, machine-readable, storage device that includes instructions that, when executed by electrical load control circuitry, causes the electrical load control circuitry to:
  cause a controllably conductive device coupled between an AC voltage source and the electrical load to reversibly transition between conductive and non-conductive states during each half-cycle of the applied AC voltage to control power delivered to an electrical load;
  generate an output to enable multi-location circuitry to receive a signal from an accessory electrical load controller for at least a portion of the AC voltage cycle when the controllably conductive device is in the non-conductive state;
  receive, from the multi-location circuitry, data representative of a pattern in a signal received from the accessory load controller, the pattern indicative of a user command received as an input by the accessory load controller; and adjust a duration of the conductive state of the controllably conductive device based on the user command received by the accessory load controller responsive to receipt of the data representative of the detected pattern.

10. The non-transitory, machine-readable, storage device of claim 9 wherein the instructions that cause the electrical load control circuitry to receive the data representative of the pattern in the signal received from the accessory load controller, the pattern indicative of the user command received as the input by the accessory load controller, further cause the load control circuitry to:

receive data representative of one of the following patterns:
a first pattern indicative of a request to decrease the power provided by the controllably conductive device;
a second pattern indicative of a user request to increase the power output provided by the controllably conductive device; and
a third pattern indicative of a user request to terminate the power output provided by the controllably conductive device.

11. The non-transitory, machine-readable, storage device of claim 9 wherein the instructions that cause the electrical load control circuitry to receive the data representative of the pattern in the signal received from the accessory load controller, the pattern indicative of the user command received as the input by the accessory load controller, further cause the load control circuitry to:

receive, from the multi-location circuitry, the data representative of one of a plurality of patterns in the signal received from the accessory load controller, the received one of the plurality of patterns received over a plurality of cycle portions when the controllably conductive device is in the non-conductive state.

12. The non-transitory, machine-readable, storage device of claim 9 wherein the instructions that cause the electrical load control circuitry to enable the multi-location circuitry to receive the signal from the accessory electrical load controller for at least the portion of the AC voltage cycle when the controllably conductive device is in the non-conductive state, further cause the load control circuitry to:

enable the multi-location circuitry after expiration of a delay period commencing with the transition of the controllably conductive device between the conductive and the non-conductive states.

\* \* \* \* \*

UNITED STATES PATENT AND TRADEMARK OFFICE
CERTIFICATE OF CORRECTION

| | | |
|---|---|---|
| PATENT NO. | : 11,751,299 B2 | Page 1 of 1 |
| APPLICATION NO. | : 17/556491 | |
| DATED | : September 5, 2023 | |
| INVENTOR(S) | : Quinn Brogan et al. | |

It is certified that error appears in the above-identified patent and that said Letters Patent is hereby corrected as shown below:

In the Claims

Column 24, Line 43 (Claim 8): Replace "The load controller of claim 1" with "The method of claim 5".

Signed and Sealed this
Twenty-fourth Day of September, 2024

Katherine Kelly Vidal
*Director of the United States Patent and Trademark Office*